(12) United States Patent
Ganth et al.

(10) Patent No.: US 9,892,079 B2
(45) Date of Patent: Feb. 13, 2018

(54) UNIFIED CONVERGED NETWORK, STORAGE AND COMPUTE SYSTEM

(71) Applicant: StorNetware Systems Pvt. Ltd., Bangalore (IN)

(72) Inventors: Rajiv Ganth, Bangalore (IN); Nagaraj Math, Bangalore (IN); Subburaj Ramasamy, Bangalore (IN)

(73) Assignee: Rajiv Ganth, Bangalore, Karnataka (IN)

( * ) Notice: Subject to any disclaimer, the term of this patent is extended or adjusted under 35 U.S.C. 154(b) by 121 days.

(21) Appl. No.: 14/800,706

(22) Filed: Jul. 16, 2015

(65) Prior Publication Data

US 2016/0026592 A1   Jan. 28, 2016

(30) Foreign Application Priority Data

Jul. 25, 2014 (IN) .......................... 3643/CHE/2014

(51) Int. Cl.
*G06F 13/40* (2006.01)
*G06F 9/455* (2006.01)
*G06F 13/10* (2006.01)

(52) U.S. Cl.
CPC ...... *G06F 13/4027* (2013.01); *G06F 9/45558* (2013.01); *G06F 13/102* (2013.01); *G06F 2009/45579* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| 6,622,164 B1 * | 9/2003 | Harrison | H04L 67/1097 361/679.32 |
| 2010/0153750 A1 * | 6/2010 | Shah | H04L 12/40045 713/300 |
| 2013/0339572 A1 * | 12/2013 | Fanning | G06F 3/0688 711/102 |
| 2014/0201305 A1 * | 7/2014 | Dalal | H04L 47/193 709/212 |

* cited by examiner

*Primary Examiner* — Idriss N Alrobaye
*Assistant Examiner* — Dayton Lewis-Taylor
(74) *Attorney, Agent, or Firm* — Ash Tankha; Lipton, Weinberger & Husick

(57) ABSTRACT

A unified converged network, storage and compute system (UCNSCS) converges functionalities of a network switch, a network router, a storage array, and a server in a single platform. The UCNSCS includes a system board, interface components free of a system on chip (SoC) such as a storage interface component and a network interface component operably connected to the system board, and a unified converged network, storage and compute application (UCNSCA). The storage interface component connects storage devices to the system board. The network interface component forms a network of UCNSCSs or connects to a network. The UCNSCA functions as a hypervisor that hosts virtual machines or as a virtual machine on a hypervisor and incorporates a storage module and a network module therewithin for controlling and managing operations of the UCNSCS and expanding functionality of the UCNSCS to operate as a converged network switch, network router, and storage array.

6 Claims, 18 Drawing Sheets

UNIFIED CONVERGED NETWORK, STORAGE AND COMPUTE SYSTEM

CROSS-REFERENCE TO RELATED APPLICATIONS

This application claims priority to and the benefit of provisional patent application number 3643/CHE/2014 titled "Unified Converged Network, Storage And Compute System", filed in the Indian Patent Office on Jul. 25, 2014, and non-provisional patent application number 3643/CHE/2014 titled "Unified Converged Network, Storage And Compute System", filed in the Indian Patent Office on Jul. 15, 2015. The specifications of the above referenced patent applications are incorporated herein by reference in their entirety.

BACKGROUND

In a data center, multiple appliances are utilized to scale out and scale up compute power and storage capacities. Networking appliances, for example, network switches and network routers are used to connect servers to each other and also to multiple storage appliances. Large numbers of servers are used for computing, which therefore require a large number of network switches, for example, Ethernet switches, fibre channel switches, etc., to connect servers to each other and to storage appliances. Storage appliances such as disk storage arrays and tape libraries are used in a data center to provide a large storage space for user data and for data backup. Due to the servers, storage appliances, and network appliances, the challenges faced in data centers are, for example, large space requirements, high energy consumption by different appliances, high energy consumption to maintain the operational temperature of the appliances, high heat emission, numerous applications required to maintain different types of server appliances, storage appliances, and network appliances, a team of various skilled professionals required to maintain the data center, high capital, substantial operational expenses, etc.

The compute power, storage and networking of servers keep growing in data centers to improve and boost application performance of the server appliances. To facilitate high performance of application servers, data centers add superior server processors, fast networking technologies, and multiple redundant storage elements. However, the server processors, fast networking technologies, and storage elements are not optimally used due to architectural limitations of the data centers. For example, a conventional architecture of servers, network appliances, and data storage arrays depends on multiple software layers from a host operating system to input and output interface controllers. Such an architecture adds high latency to input/output (I/O) throughput.

Cloud and parallel data processing and storage have become paramount as the need for data storage, data processing, and intelligent storage has increased. Numerous techniques and solutions available in the field of cloud data processing and parallel data processing rely on efficient hardware and software solutions. Data centers have resorted to private, public and/or hybrid cloud solutions as incorporating computing power within or away from storage is not a choice anymore. Furthermore, the basic idea behind a cloud infrastructure is to grow with the use of computing and storage power. However, the dynamic growth of data processing and storage within the cloud infrastructure poses challenges to the current infrastructure. The cloud industry or data centers typically fine-tune their solutions and technologies associated with servers, network appliances, and storage to cater to a constant demand of exponential data growth for efficiency. Ensuring efficiency of data processing and growth in computing requires large investments in terms of capital, power, cooling techniques, etc. Therefore, an Infrastructure as a Service (IaaS) provider spends more time and money to obtain appropriate solutions for an offered infrastructure.

A conventional architecture of a server, a network appliance, or a data storage array utilizes a host bus adapter (HBA) containing a System on Chip (SoC) to handle input and output of data flow on a respective system board. The SoC is a set of hardware components, for example, a central processing unit (CPU), a memory controller, a system bus controller, and a peripheral interconnect bus controller that enables the host bus adapter to run software that manages the data flow through the host bus adapter and target devices, for example, disk drives, network ports, etc. This SoC runs software for data communication to and from a target device, for example, a data storage device, or a data storage appliance, or a network server, or a network appliance. The combination of hardware and software for data access and communication reduces data throughput of the overall system. Furthermore, there are additional issues in conventional architecture based appliances that hinder the performance of the system, for example, underutilization of hardware appliances, low adaptability to dynamic growth, low performance, interoperability issues between appliances manufactured by different vendors, a high total cost of ownership that involves large space requirements, high energy consumption, requirements for skilled maintenance teams, etc.

In a conventional architecture of a server, network switch, network router and data storage array, connecting element controllers, for example, small computer system interfaces, advanced technology attachments, serial attached small computer system interfaces, serial advanced technology attachments, fibre channel controllers, Ethernet controllers, etc., are mounted on system boards of servers, network switches, network routers, and data storage arrays as host bus adapters or line cards. The host bus adapters contain specific hardware to manage connecting ports to target devices, for example, hard disk drives, network switches, network routers, and other servers. Each host bus adapter also contains a System on Chip (SoC). Typically, a data center houses hundreds and thousands of servers, network switches, network routers, and storage arrays that are built on the above mentioned conventional architecture. SoC hardware and software on the SoC introduces additional layers that cause additional latency to the data flow, increases the energy consumption, and increases heat emission. As the new era of data centers emerge, the work load on the servers, the network switches, the network routers, and the storage arrays suffers due to the above mentioned conventional architecture that utilizes multiple hardware and software layers. To improve the architecture to be future ready and to withstand and take more work load, there is a need for reducing the hardware and software layers, for incorporating multiple hardware components and associated software on one functional plane, that is, on a system board, and for developing a specialized software without hindering the software implementation of existing application servers.

Hence, there is a long felt but unresolved need for a unified converged network, storage and compute system that incorporates the functionalities of a network switch, a network router, a network interface card, a storage array, and a compute functionality of a server into a single physical server for expanding the functionality of the physical server and the connectivity of the physical server to other physical servers in a data center. Moreover, there is a need for a unified converged network, storage and compute system comprising interface components that are free of the System on Chip (SoC) to allow direct access to storage devices and a network and to reduce latency, energy consumption, and heat emission. Furthermore, there is a need for a unified converged network, storage and compute system that reduces hardware and software layers, incorporates multiple hardware components and associated software on a single system board, and comprises a specialized software that does not hinder the software implementation of existing application servers.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The unified converged network, storage and compute system (UCNSCS) disclosed herein addresses the above stated need for incorporating functionalities of a network switch, a network router, a network interface card, a storage array, and a compute functionality of a server into a single platform, thereby expanding the functionality of the UCNSCS and the connectivity of the UCNSCS to other UCNSCSs in a data center. The UCNSCS disclosed herein comprises interface components that are free of a System on Chip (SoC) to allow direct access to storage devices and a network and to reduce latency, energy consumption, and heat emission. Furthermore, the UCNSCS disclosed herein reduces hardware and software layers, incorporates multiple hardware components and associated software on a single system board, and comprises specialized software that does not hinder software implementation of existing application servers.

In an embodiment, the unified converged network, storage and compute system (UCNSCS) is configured in a rack unit chassis of a configurable size, for example, a two rack unit chassis, a three rack unit chassis, a four rack unit chassis, etc. The UCNSCS disclosed herein comprises a system board, a storage interface component free of a System on Chip (SoC), a network interface component free of the SoC, and a unified converged network, storage and compute application (UCNSCA) executable by at least one processor. The storage interface component is operably connected to the system board via system interconnect bus connectors. The storage interface component connects an array of storage devices, for example, disk drives, solid state drives, solid state hybrid drives, etc., to the system board. The storage devices are connected on the local UCNSCS via the storage interface component. The storage interface component comprises disk interface connectors, a system interconnect bus switch, and the system interconnect bus connectors. The disk interface connectors are configured on a first section, for example, a front section of the storage interface component to connect to the array of storage devices. The system interconnect bus switch is configured on a second section, for example, a rear section of the storage interface component to connect the array of storage devices to the system board. The system interconnect bus connectors are configured on the second section, for example, the rear section of the storage interface component to connect to the system board. The network interface component is operably connected to the system board via system interconnect bus connectors. In an embodiment, the network interface component is a converged network switch and router adapter free of the SoC. In another embodiment, the network interface component is a network interface card free of the SoC. The network interface component is configured to form a network of UCNSCSs and/or connect to a network.

The unified converged network, storage and compute application (UCNSCA) controls and manages operations of the unified converged network, storage and compute system (UCNSCS) and expands functionality of the UCNSCS to operate as a converged network switch, network router, and storage array. The UCNSCA is a compute module that comprises a storage module and a network module. In an embodiment, the UCNSCA is configured as a hypervisor that hosts virtual machines and incorporates the storage module and the network module therewithin, thereby allowing direct access to storage devices and a network respectively. The UCNSCA configured as a hypervisor acts as a hardware abstraction layer by incorporating software and firmware functions therewithin. In another embodiment, the UCNSCA is configured as a virtual machine operating on a hypervisor and incorporates the storage module and the network module therewithin. The storage module of the UCNSCA is a software module that interacts with the storage interface component via a system interconnect bus to configure the storage interface component, monitor data flow between the storage interface component, the system board, and the array of storage devices, access data stored in the array of storage devices connected to the storage interface component, and access the data stored in storage devices of other UCNSCSs that are connected together in a computer cluster, for example, over an Ethernet network. The network module of the UCNSCA is a software module that interacts with the network interface component via a system interconnect bus to configure the network interface component, monitor data flow through the network interface component, and perform connections to the network, network switching functions, and network router functions.

In the unified converged network, storage and compute system (UCNSCS) disclosed herein, hardware components, for example, the storage interface component and the network interface component are converged onto one functional plane, that is, onto the system board, and specialized software, that is, the unified converged network, storage and compute application (UCNSCA) is developed without hindering software implementation of existing application servers. The UCNSCA disclosed herein performs functions to manage data flow through hardware boards, for example, the system board, the system interconnect bus switch board, etc., and also to manage the hardware. The UCNSCA configured as a hypervisor enables the UCNSCS to run multiple virtual machines that, in turn, run existing application servers as a conventional server.

Moreover, the unified converged network, storage and compute system (UCNSCS) does not require an external network switch or an external network router to interconnect other systems, since the UCNSCS contains the network interface component to implement network switch and network router functionalities within. Furthermore, the storage module of the unified converged network, storage and compute application (UCNSCA) pools storage devices of other systems via a network and creates a logical disk, thereby precluding the need for an external data storage array. The UCNSCS comprising the storage module and the network module within the UCNSCA reduces latency in accessing data, reduces the cost of the UCNSCS, reduces a total cost of ownership (TCO) by converging hardware components, reduces energy consumption, and boosts software performance with high performance server central processing units (CPUs), memory and software architecture. Furthermore, updating software features results in reduced system downtime in a data center.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements may be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
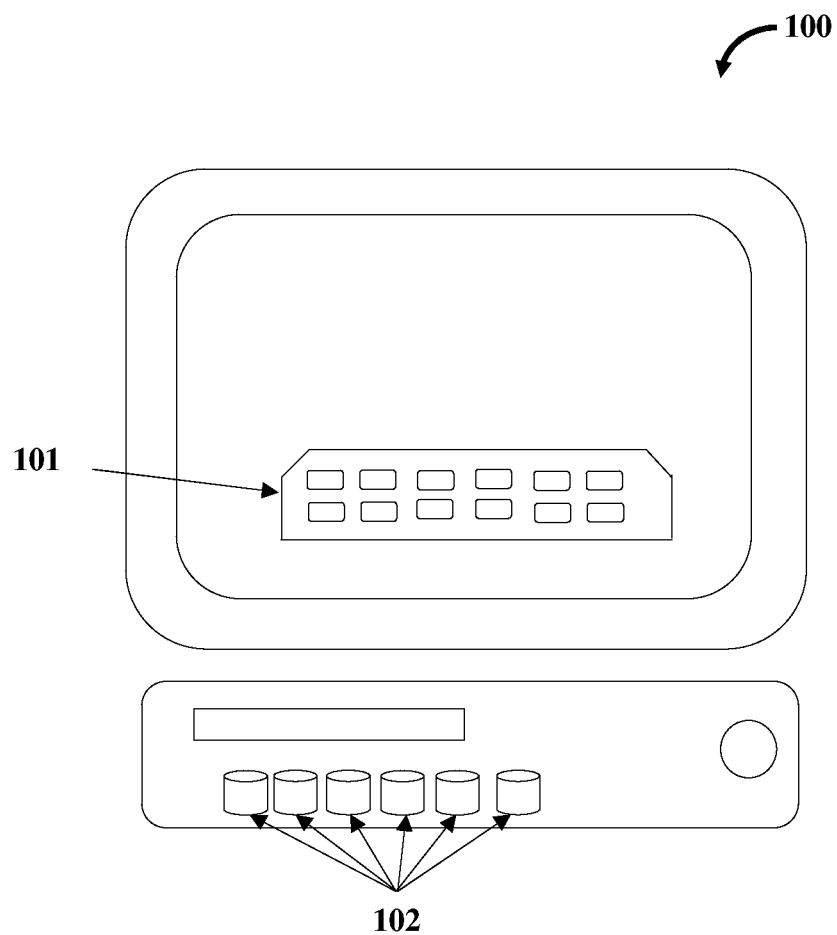
FIG. 1 exemplarily illustrates a unified converged network, storage and compute system symbolically showing converged functionalities of a converged network switch and network router and an array of storage devices, with a compute functionality of a server.

Disclosed herein is a unified converged network, storage and compute system (UCNSCS) 100 exemplarily illustrated in FIG. 1, comprising a combination of hardware and software. The software on the UCNSCS 100 is referred to as a unified converged network, storage and compute application (UCNSCA) 107 or 112 as exemplarily illustrated in FIGS. 3-4.

FIG. 1 exemplarily illustrates the unified converged network, storage and compute system (UCNSCS) 100 symbolically showing converged functionalities of a converged network switch and network router 101 and an array of storage devices 102, with a compute functionality of a server, which expand functionality of the UCNSCS 100 and connectivity of the UCNSCS 100 to other UCNSCSs 100 in a data center. As used herein, "converged network switch and network router" refers to a convergence of a physical network switch and/or a network router and a software defined network switch and/or a software defined network router. The converged network switch and network router 101 configured in the UCNSCS 100 can be, for example, an Ethernet switch and/or an Ethernet router or a fibre channel over an Ethernet switch. The storage devices 102 comprise, for example, hard drives, interconnect bus based serial attached small computer system interface drives, interconnect bus based serial advanced technology attachment drives, solid state drives, solid state hybrid drives, etc. The UCNSCS 100 disclosed herein improves and enhances a scale up capability of a data center by scaling out. By incorporating functionalities of storage and networking appliances within the UCNSCS 100, the need for external storage appliances and external networking appliances in the data center is eliminated.

Figure 2A:
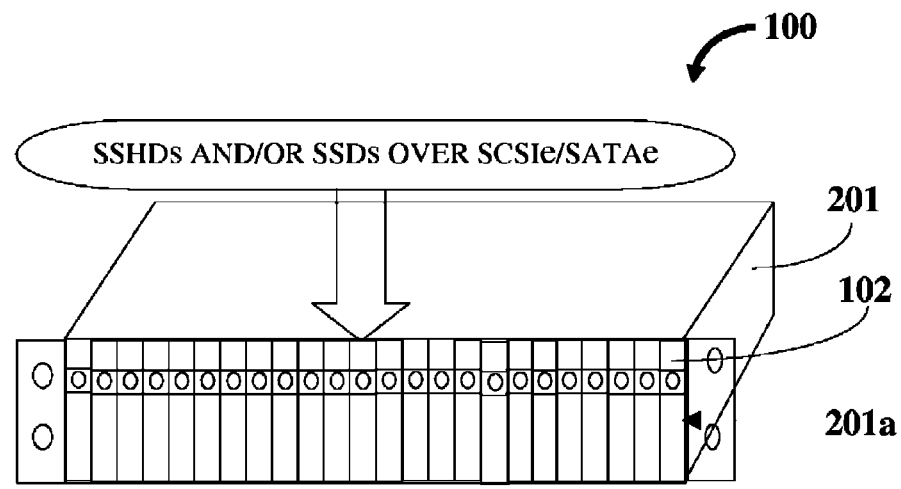
FIG. 2A exemplarily illustrates a front perspective view of the unified converged network, storage and compute system configured in a two rack unit chassis, showing multiple storage devices.

FIG. 2A exemplarily illustrates a front perspective view of the unified converged network, storage and compute system (UCNSCS) 100 configured, for example, in a two rack unit chassis 201, showing multiple storage devices 102. As exemplarily illustrated in FIG. 2A, the hardware of the UCNSCS 100 is enclosed in a two rack unit chassis 201. The UCNSCS 100 configured in the two rack unit chassis 201 has more connectivity options to function as a server appliance, a network appliance, and a storage appliance. A front section 201a of the UCNSCS 100 houses, for example, about twenty four or more storage devices 102 to about forty eight storage devices 102 based on the size of the storage devices 102. Storage devices 102, for example, solid state drives are smaller in size compared to solid state hybrid drives or normal hard disk drives. Therefore, the UCNSCS 100 can house, for example, up to forty eight solid state drives, and a maximum of twenty four solid state hybrid drives or hard disk drives. The front section 201a of the UCNSCS 100 enables hot-pluggable storage devices 102 to be added or removed based on the need. In an embodiment, the UCNSCS 100 is configured in a rack unit chassis of a different size, for example, a three rack unit chassis, a four rack unit chassis, etc., which can house, for example, a minimum of twelve storage devices 102 such as hard disks to about ninety six storage devices 102.

Figure 2B:
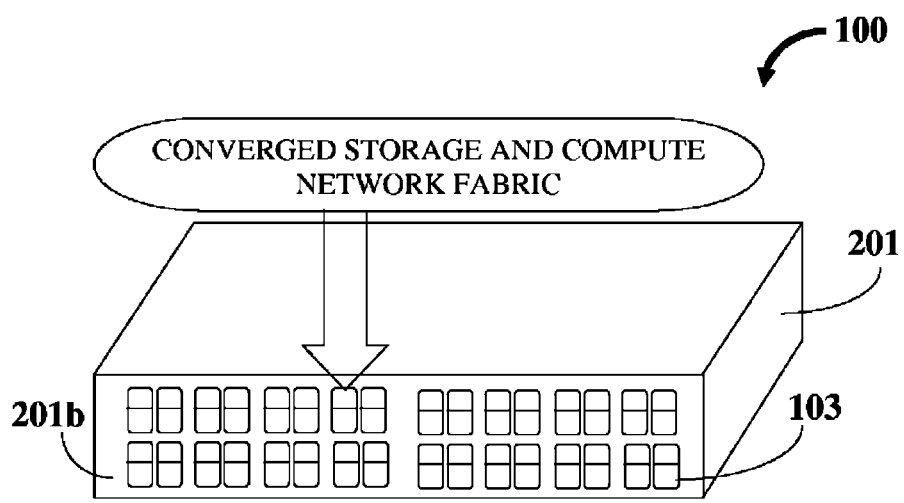
FIG. 2B exemplarily illustrates a rear perspective view of the unified converged network, storage and compute system configured in the two rack unit chassis, showing multiple network ports.

FIG. 2B exemplarily illustrates a rear perspective view of the unified converged network, storage and compute system (UCNSCS) 100 configured in the two rack unit chassis 201, showing multiple network ports 103. As used herein, "network ports" refer to transceivers that connect networking hardware of a network interface component 106 exemplarily illustrated in FIGS. 3-4, to a fiber optic cable or a copper cable. The network ports 103 are, for example, quad small form-factor pluggable (QSFP+) ports. A rear section 201b of the UCNSCS 100 is exemplarily illustrated in FIG. 2B. The rear section 201b of the UCNSCS 100 houses, for example about two or twenty four network ports 103 to about thirty two network ports 103. The network ports 103 are configured to be connected to a network. In an embodiment, the UCNSCS 100 houses two network ports 103 that enable the UCNSCS 100 to connect to a network of a data center. In another embodiment, the UCNSCS 100 houses twenty four to thirty two network ports 103 as exemplarily illustrated in FIG. 2B. In the embodiment exemplarily illustrated in FIG. 2B, the UCNSCS 100 functions as a network switch and a network router in a data center.

Figure 3:
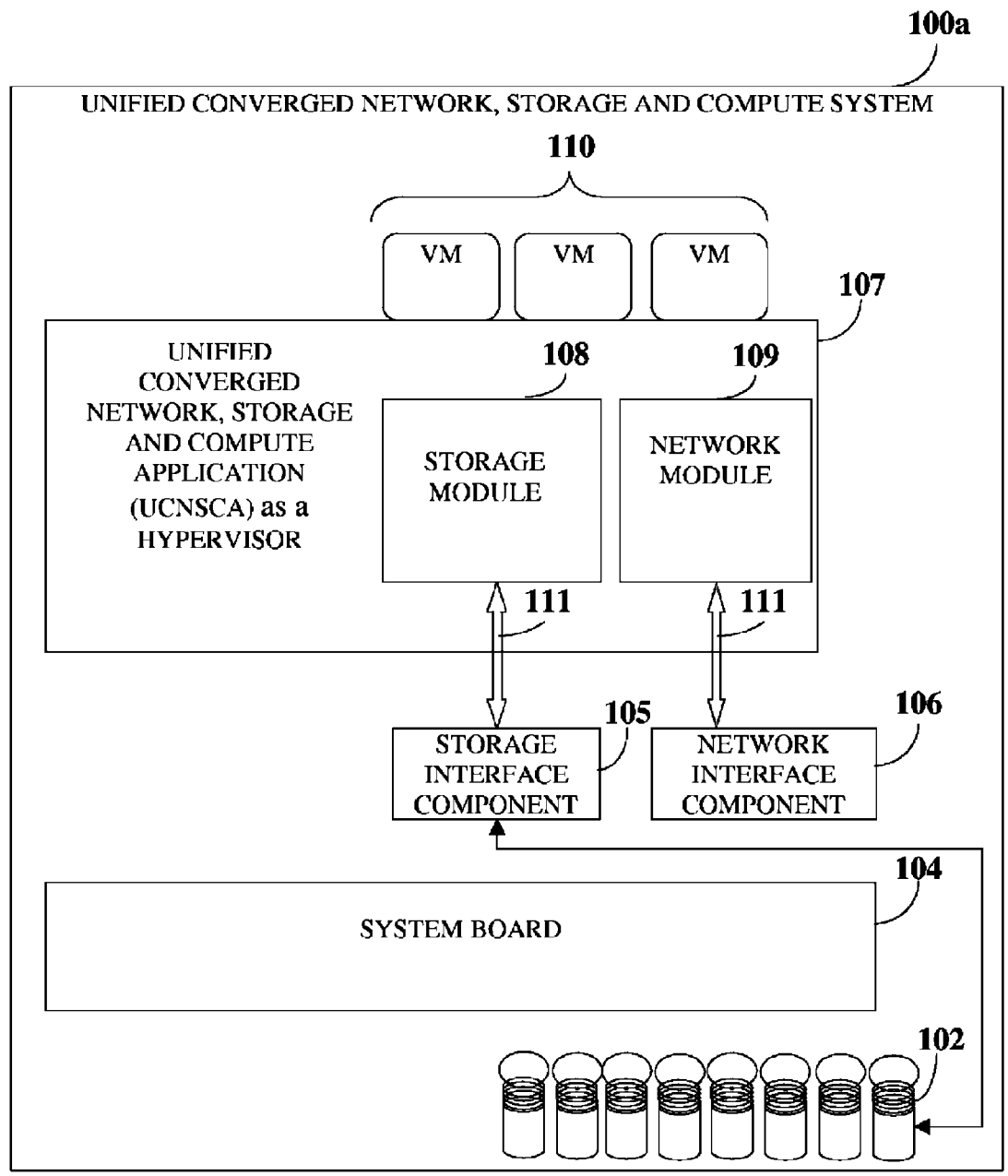
FIG. 3 exemplarily illustrates a block diagram of the unified converged network, storage and compute system, showing a relationship between hardware and software of the unified converged network, storage and compute system, where a unified converged network, storage and compute application functions as a hypervisor.

FIG. 3 exemplarily illustrates a block diagram of the unified converged network, storage and compute system (UCNSCS) 100a, showing a relationship between hardware and software of the UCNSCS 100a, where the unified converged network, storage and compute application (UCNSCA) 107 functions as a hypervisor or a virtual machine monitor. As exemplarily illustrated in FIG. 3, the UCNSCS 100a comprises a system board 104, interface components 105 and 106 free of a System on Chip (SoC), and the UCNSCA 107 configured as a hypervisor. As used herein, "system board" refers is a printed circuit board that houses electronic components, for example, a central processing unit (CPU) 117, a memory 118, and connectors for connecting to other peripheral components exemplarily illustrated in FIG. 5 and FIG. 7. The system board 104 is, for example, a dual socket Xeon® based server motherboard of Intel Corporation with a random access memory (RAM) of, for example, about 64 gigabytes to about 1 terabyte. The system board 104 comprises system interconnect bus connectors (not shown), for example, peripheral component interconnect express (PCIe) connectors or slots that connect to corresponding system interconnect bus connectors 120 and 125, for example, PCIe connectors of a network interface component 106 and a storage interface component 105 respectively. As used herein, "system interconnect bus connectors" refer to serial computer bus connectors, for example, PCIe connectors or PCIe slots exemplarily illustrated in FIG. 6, FIG. 8, and FIG. 9B, that connect electronic components, for example, the network interface component 106 and the storage interface component 105 to the system board 104.

The interface components comprise the storage interface component 105, and the network interface component 106 which are hardware components operably connected to the system board 104. As used herein, "storage interface component" refers to a printed circuit board that houses electronic components, for example, a system interconnect bus switch 116, a power module 126, disk interface connectors 124 for connecting storage devices 102 to the system board 104, and system interconnect bus connectors 125 exemplarily illustrated in FIGS. 9A-9B. The storage interface component 105 is operably connected to the system board 104 via the system interconnect bus connectors 125 exemplarily illustrated in FIG. 9B. The storage interface component 105 is configured to connect an array of storage devices 102 to the system board 104. Also, as used herein, "network interface component" refers, in an embodiment, to a converged network switch and router adapter (CNSRA) 114 that houses electronic components, for example, a network fabric silicon 115, a power module 119, system interconnect bus connectors 120, and network ports 103 exemplarily illustrated in FIG. 6, and in another embodiment, to a network interface card 121 that houses electronic components, for example, a network interface card silicon 122, a power module 123, system interconnect bus connectors 120, and network ports 103 exemplarily illustrated in FIG. 8. The network interface component 106 is operably connected to the system board 104 via the system interconnect bus connectors 120 exemplarily illustrated in FIG. 6 and FIG. 8. The network interface component 106 is configured to form a network of unified converged network, storage and compute systems 100a or nodes and/or connect to a network.

Figure 5:
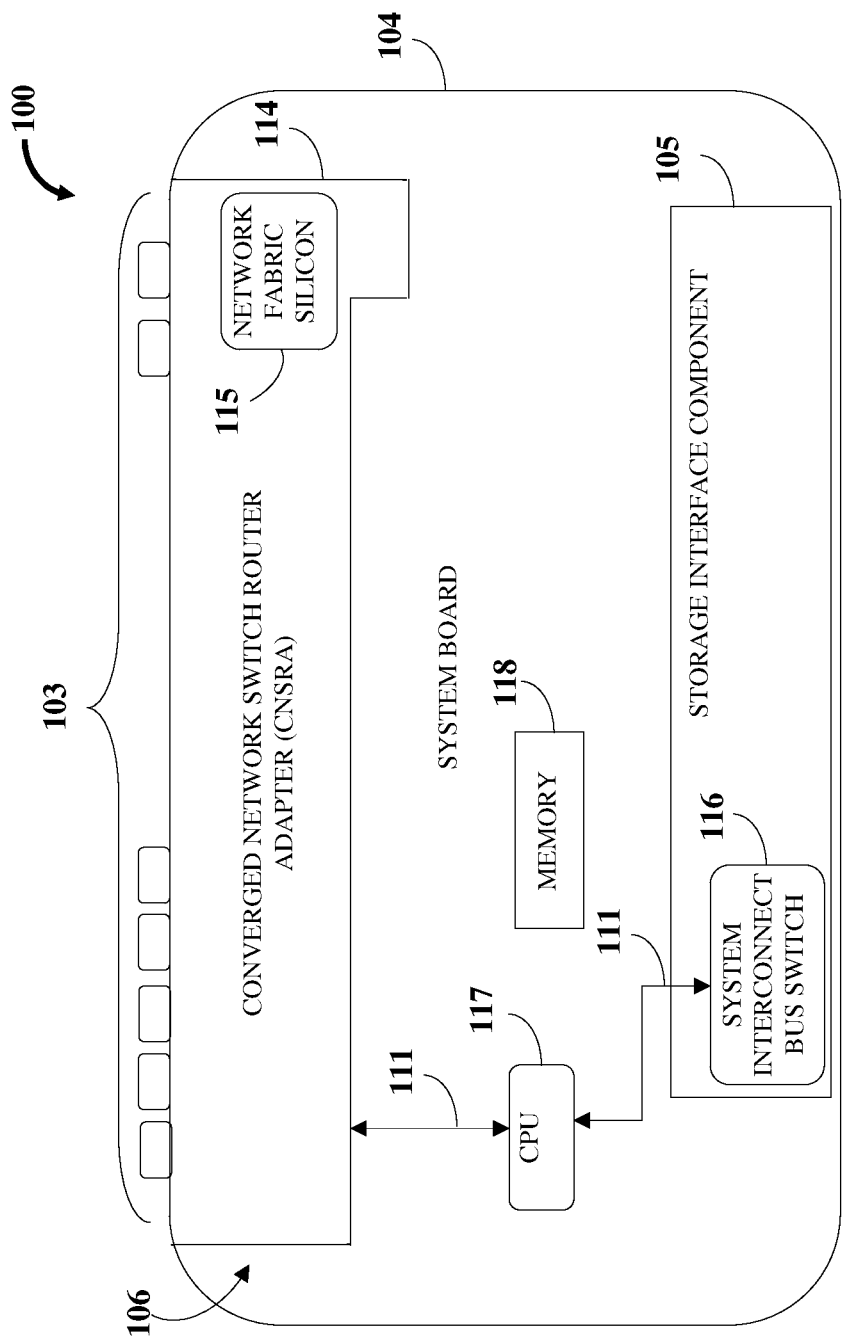
FIG. 5 exemplarily illustrates internal components of the unified converged network, storage and compute system, showing a network interface component configured as a converged network switch and router adapter comprising a network fabric silicon that enables the unified converged network, storage and compute system to function as a converged network switch and network router.
Figure 7:
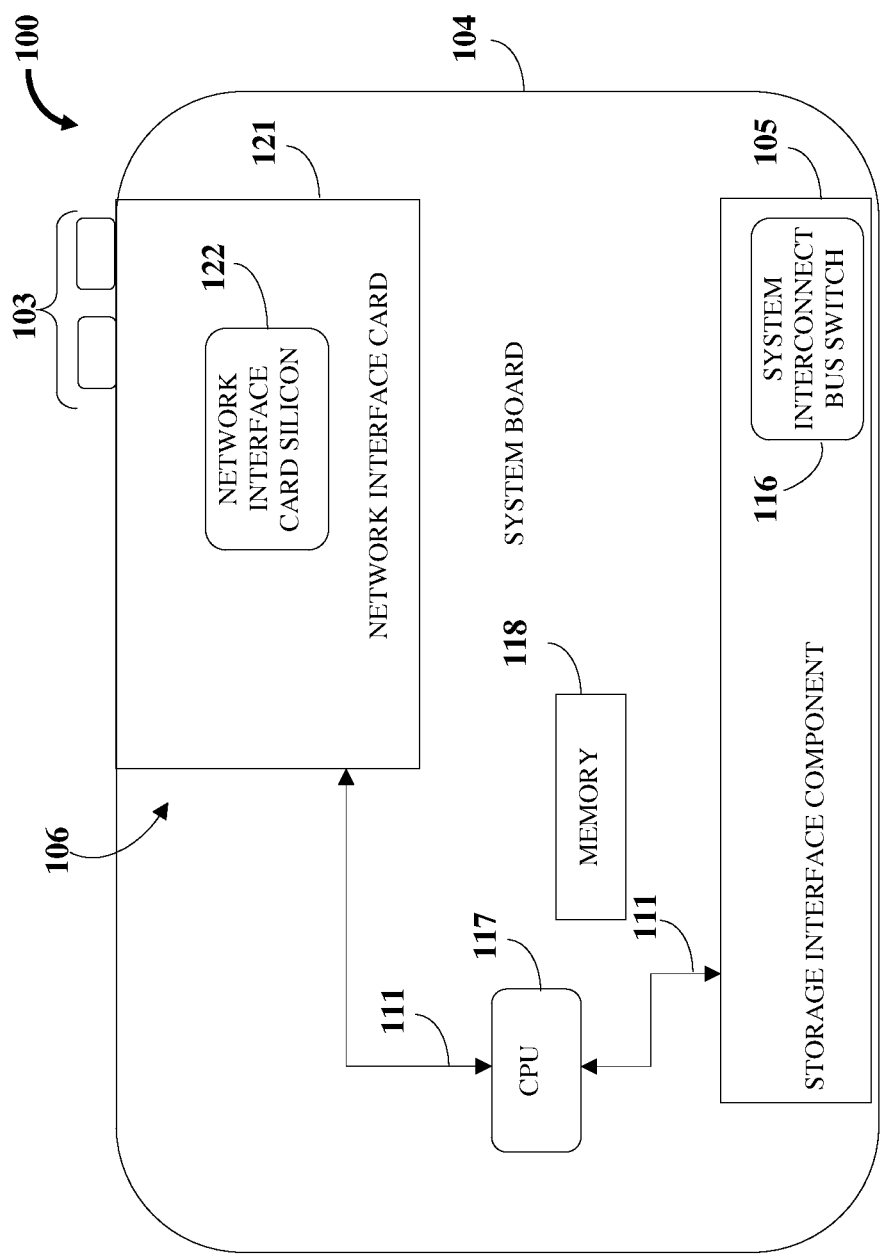
FIG. 7 exemplarily illustrates internal components of the unified converged network, storage and compute system, showing the network interface component configured as a physical network interface card comprising a network interface card silicon that enables the unified converged network, storage and compute system to connect to a network of unified converged network, storage and compute systems and storage devices of other unified converged network, storage and compute systems connected over a network.

The unified converged network, storage and compute application (UCNSCA) 107 is executable by at least one processor, for example, a central processing unit (CPU) 117 exemplarily illustrated in FIG. 5 and FIG. 7, configured to control and manage operations of the unified converged network, storage and compute system (UCNSCS) 100a and expand functionality of the UCNSCS 100a to operate as a converged network switch, network router, and storage array. The processor is, for example, the Intel Xeon® E5-2650 processor, the AMD Opteron® 6380 processor of Advanced Micro Devices, Inc., etc. The UCNSCA 107 comprises software modules, namely, a storage module 108 and a network module 109 executable by at least one processor, for example, the CPU 117 for performing their respective functions disclosed below.

In an embodiment as exemplarily illustrated in FIG. 3, the unified converged network, storage and compute application (UCNSCA) 107 is a hypervisor configured to incorporate the storage module 108 and the network module 109 therewithin and to host virtual machines 110. As used herein, the term "hypervisor" refers to a virtual machine monitor configured as a computer software or firmware that creates and runs virtual machines 110. In this embodiment, the storage module 108 and the network module 109 of the UCNSCA 107 that functions as a hypervisor interacts with the storage interface component 105 and the network interface component 106 respectively, to enable access to storage and a network respectively. The storage module 108 is a software module that interacts with the storage interface component 105 via a system interconnect bus 111, for example, a peripheral component interconnect express (PCIe) bus to configure the storage interface component 105, monitor data flow between the storage interface component 105, the system board 104, and the array of storage devices 102, access data stored in the array of storage devices 102 connected to the storage interface component 105, and access data stored in storage devices 102 of other unified converged network, storage and compute systems 100a that are connected together in a computer cluster, for example, over a Ethernet network as exemplarily illustrated in FIG. 16. The system interconnect bus 111 refers to a bus that allows communication between the storage module 108 and the storage interface component 105. The network module 109 is a software module that interacts with the network interface component 106 via a system interconnect bus 111, for example, a peripheral component interconnect express (PCIe) bus to configure the network interface component 106, monitor data flow through the network interface component 106, and perform connections to the network, network switching functions, and network router functions. The system interconnect bus 111 allows communication between the network module 109 and the network interface component 106.

Figure 4:
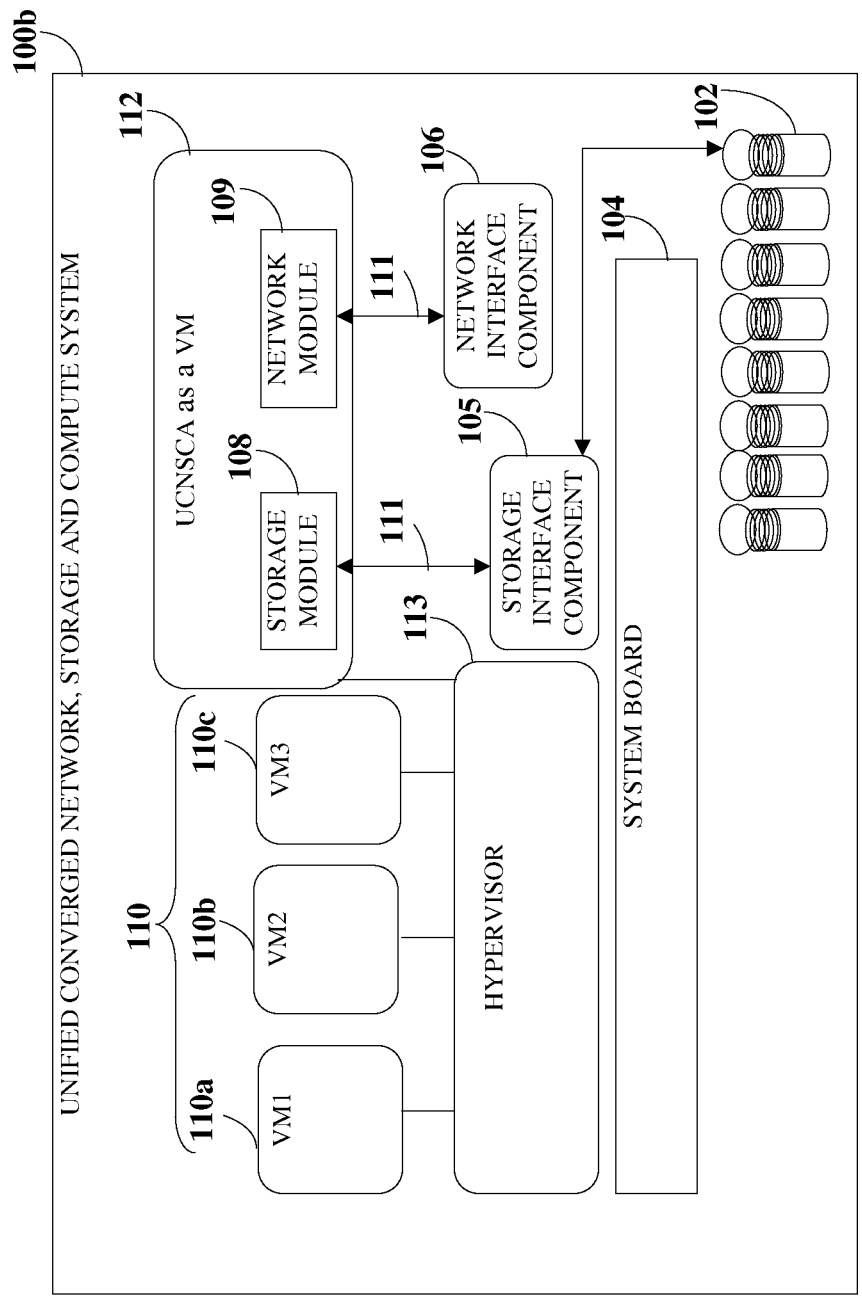
FIG. 4 exemplarily illustrates a block diagram of an embodiment of the unified converged network, storage and compute system, showing a relationship between hardware and software of the unified converged network, storage and compute system, where the unified converged network, storage and compute application functions as a virtual machine.

FIG. 4 exemplarily illustrates a block diagram of an embodiment of the unified converged network, storage and compute system (UCNSCS) 100b, showing a relationship between hardware and software of the unified converged network, storage and compute system 100b, where the unified converged network, storage and compute application (UCNSCA) 112 functions as a virtual machine. As exemplarily illustrated in FIG. 4, the UCNSCS 100b comprises the system board 104, the interface components 105 and 106 free of a System on Chip (SoC) as disclosed in the detailed description of FIG. 3, and the UCNSCA 112 configured as a virtual machine operating on a hypervisor 113. Additional virtual machines 110, for example, VM1 110a, VM2 110b, and VM3 110c run on the hypervisor 113. The UCNSCA 112 is executable by at least one processor, for example, a central processing unit (CPU) 117 exemplarily illustrated in FIG. 5 and FIG. 7, configured to control and manage operations of the UCNSCS 100b and expand functionality of the UCNSCS 100b to operate as a converged network switch, network router, and storage array. In an embodiment as exemplarily illustrated in FIG. 4, the UCNSCA 112 is a virtual machine configured to incorporate the storage module 108 and the network module 109 therewithin. In this embodiment, the storage module 108 and the network module 109 of the UCNSCA 112 that functions as a virtual machine, interacts with the storage interface component 105 and the network interface component 106 respectively, to enable access to storage and a network respectively as disclosed in the detailed description of FIG. 3. In the embodiment exemplarily illustrated in FIG. 4, the UCNSCS 100b operates on a hypervisor 113, for example, the ESX® hypervisor of VMware, Inc., the Hyper-V® hypervisor of Microsoft Corporation, a kernel-based virtual machine (KVM) of Red Hat Inc., the XenServer® virtualization and hypervisor management platform of Citrix Systems, Inc., etc.

In the embodiments exemplarily illustrated in FIGS. 3-4, the unified converged network, storage and compute application (UCNSCA) 107 or 112 performs functions of a logical volume manager (LVM), network switch and network router firmware, and network interface card firmware, and implements storage service functions and networking functions. The storage module 108 of the UCNSCA 107 or 112 performs one or more storage service functions comprising, for example, implementing a redundant array of independent storage devices or drives, creating a storage snapshot, rebuilding lost data, remote replication, implementing a distributed object store, deduplication, compression, encryption, backup, recovery, etc. The network module 109 of the UCNSCA 107 or 112 performs one or more networking functions comprising, for example, data compression, data encryption, data center bridging, priority flow control, file sharing, etc. In the embodiments exemplarily illustrated in FIGS. 3-4, the UCNSCA 107 or 112 comprising the storage module 108 and the network module 109 is executed directly on the main processor, for example, the central processing unit (CPU) 117 of the system board 104 exemplarily illustrated in FIG. 5 and FIG. 7, thereby reducing input/output (I/O) latency and increasing the I/O throughput.

FIG. 5 exemplarily illustrates internal components of the unified converged network, storage and compute system (UCNSCS) 100, showing the network interface component 106 configured as a converged network switch and router adapter (CNSRA) 114 comprising a network fabric silicon 115 that enables the UCNSCS 100 to function as a converged network switch and network router 101 exemplarily illustrated in FIG. 1. As used herein, "converged network switch and router adapter" refers to a printed circuit board that houses the network fabric silicon 115, a power module 119, system interconnect bus connectors 120 to connect to the system board 104, and network ports 103 to connect to a network as exemplarily illustrated in FIG. 6. As exemplarily illustrated in FIG. 5, the internal components of the UCNSCS 100 comprise the CNSRA 114, the storage interface component 105, one or more processors such as central processing units (CPUs) 117, and a memory 118. FIG. 5 also shows the network ports 103 extending from the CNSRA 114. In an embodiment, the UCNSCS 100 has more than one CPU 117 on the system board 104, for example, with 256 gigabytes (GB) to 1 terabyte (TB) of memory 118.

The converged network switch and router adapter (CNSRA) 114 and the storage interface component 105 are connected to the central processing units (CPUs) 117 through system interconnect buses 111. As used herein, "system interconnect bus" refers to a bus that connects a processor, for example, a CPU 117 of the system board 104 to other components of the system board 104. The system interconnect buses 111 are, for example, peripheral component interconnect express (PCIe) buses. The CNSRA 114 comprises a network fabric silicon 115, system interconnect bus connectors 120, one or more power modules 119, and, for example, about twenty four to about thirty two network ports 103 as exemplarily illustrated in FIG. 6 and as disclosed in the detailed description of FIG. 6, which enable the unified converged network, storage and compute system (UCNSCS) 100 to function as converged network switch and network router 101 exemplarily illustrated in FIG. 1. The storage interface component 105 comprises a system interconnect bus switch 116 that interconnects storage devices 102 exemplarily illustrated in FIGS. 3-4, directly to the CPUs 117 of the UCNSCS 100. The system interconnect bus switch 116 is, for example, a peripheral component interconnect express (PCIe) switch of PLX Technology, Inc. The storage interface component 105 with the system interconnect bus switch 116 enables the UCNSCS 100 to connect to multiple storage devices 102. Similar to the network interface component 106, the storage interface component 105 comprises system interconnect bus connectors 125 and one or more power modules 126 as exemplarily illustrated in FIG. 9B and as disclosed in the detailed description of FIG. 9B.

Figure 6:
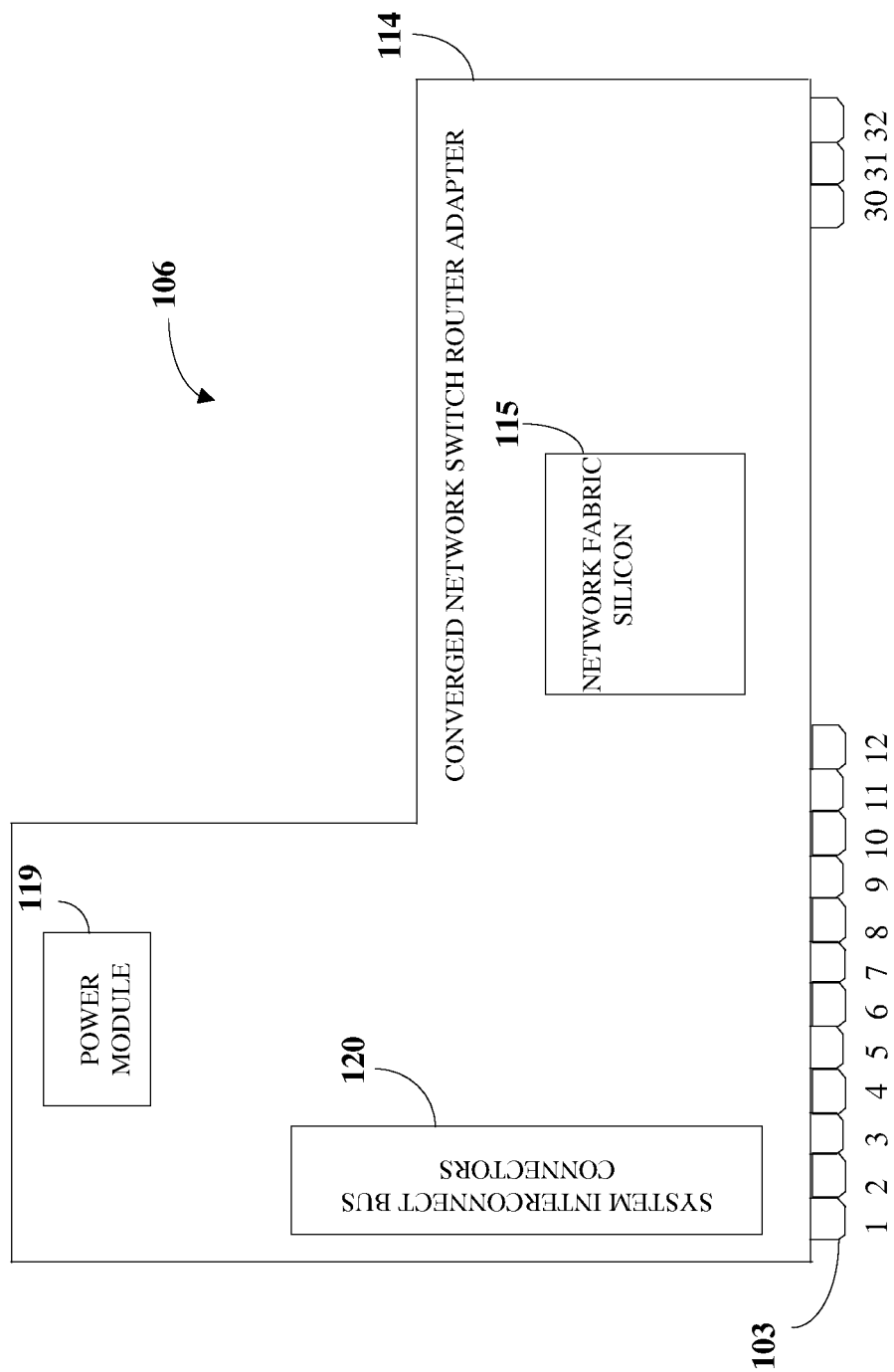
FIG. 6 exemplarily illustrates a top elevation view of the network interface component configured as the converged network switch and router adapter.

FIG. 6 exemplarily illustrates a top elevation view of the network interface component 106 configured as the converged network switch and router adapter (CNSRA) 114. In an embodiment, the network interface component 106 is a CNSRA 114 free of a System on Chip (SoC) as exemplarily illustrated in FIG. 6. FIG. 6 exemplarily illustrates components of the CNSRA 114. The CNSRA 114 is configured to allow the unified converged network, storage and compute system (UCNSCS) 100 exemplarily illustrated in FIG. 5, to be an Ethernet network switch and/or an Ethernet network router of a data center. The CNSRA 114 comprises system interconnect bus connectors 120, a network fabric silicon 115 or a network switch silicon, a power module 119, and multiple network ports 103. The CNSRA 114 is operably connected to the system board 104 exemplarily illustrated in FIG. 5, via the system interconnect bus connectors 120. The system interconnect bus connectors 120 are, for example, peripheral component interconnect express (PCIe) connectors such as PCIe version 2.x/3.x/4.x connectors. The network fabric silicon 115 is a hardware chip that routes network communication packets from one network port 103 to another network port 103 based on an address provided in a network communication packet. The network fabric silicon 115 is configured to be controlled and managed directly by the UCNSCS 100. The network fabric silicon 115 configures the UCNSCS 100 to function as a converged network switch and network router 101 exemplarily illustrated in FIG. 1. The network fabric silicon 115 used in the CNSRA 114 is manufactured, for example, by Broadcom Corporation, Mellanox Technologies, Inc., etc.

The power module 119 supplies power from an external power source (not shown) to the converged network switch and router adapter (CNSRA) 114. The network ports 103 of the CNSRA 114 expand connection capability of the unified converged network, storage and compute system (UCNSCS) 100 to connect to, for example, about twenty four UCNSCSs to about thirty two UCNSCSs. The network ports 103 are configured to be connected to a network. The network ports 103 are, for example, quad small form-factor pluggable (QSFP+) ports. In an embodiment, the network ports 103 of the CNSRA 114 can be configured, for example, as Ethernet ports or fibre channel over Ethernet ports. The CNSRA 114 comprises, for example, about twenty four network ports 103 to about thirty two network ports 103 configured to allow the UCNSCS 100 to operate, for example, as a fibre channel over an Ethernet switch, an Ethernet switch and/or an Ethernet router, or any combination thereof. In an embodiment, the CNSRA 114 provides network connectivity to the UCNSCS 100 at a speed of, for example, about 40 Gigabits per second (Gbps). The CNSRA 114 does not facilitate a direct connection of the UCNSCS 100 to storage devices 102 exemplarily illustrated in FIG. 2A. However, the CNSRA 114 allows the UCNSCS 100 to connect to the storage devices of sibling UCNSCSs that are connected together in a computer cluster, for example, over an Ethernet network.

FIG. 7 exemplarily illustrates internal components of the unified converged network, storage and compute system (UCNSCS) 100, showing the network interface component 106 configured as a physical network interface card 121 comprising a network interface card silicon 122 that enables the UCNSCS 100 to connect to a network of UCNSCSs and storage devices of other UCNSCSs connected over a network. As exemplarily illustrated in FIG. 7, the internal components of the UCNSCS 100 comprise the network interface card 121, the storage interface component 105, one or more processors such as central processing units (CPUs) 117, and a memory 118. FIG. 7 also shows the network ports 103 extending from the network interface card 121. In an embodiment, the UCNSCS 100 has more than one CPU 117 on the system board 104, for example, with 256 gigabytes (GB) to 1 terabyte (TB) of memory 118. The network interface card 121 and the storage interface component 105 are connected to the CPUs 117 through system interconnect buses 111, for example, peripheral component interconnect express (PCIe) buses. The network interface card 121 comprises a network interface card silicon 122, system interconnect bus connectors 120, one or more power modules 123, and two network ports 103 as exemplarily illustrated in FIG. 8 and as disclosed in the detailed description of FIG. 8. The network ports 103 enable the UCNSCS 100 to connect to an Ethernet network fabric in a data center. The storage interface component 105 comprises a system interconnect bus switch 116 that interconnects storage devices 102 exemplarily illustrated in FIGS. 3-4, directly to the CPUs 117 of the UCNSCS 100. The storage interface component 105 with the system interconnect bus switch 116 enables the UCNSCS 100 to connect to multiple storage devices 102. Similar to the network interface component 106, the storage interface component 105 comprises system interconnect bus connectors 125 and one or more power modules 126 as exemplarily illustrated in FIG. 9B and as disclosed in the detailed description of FIG. 9B.

Figure 8:
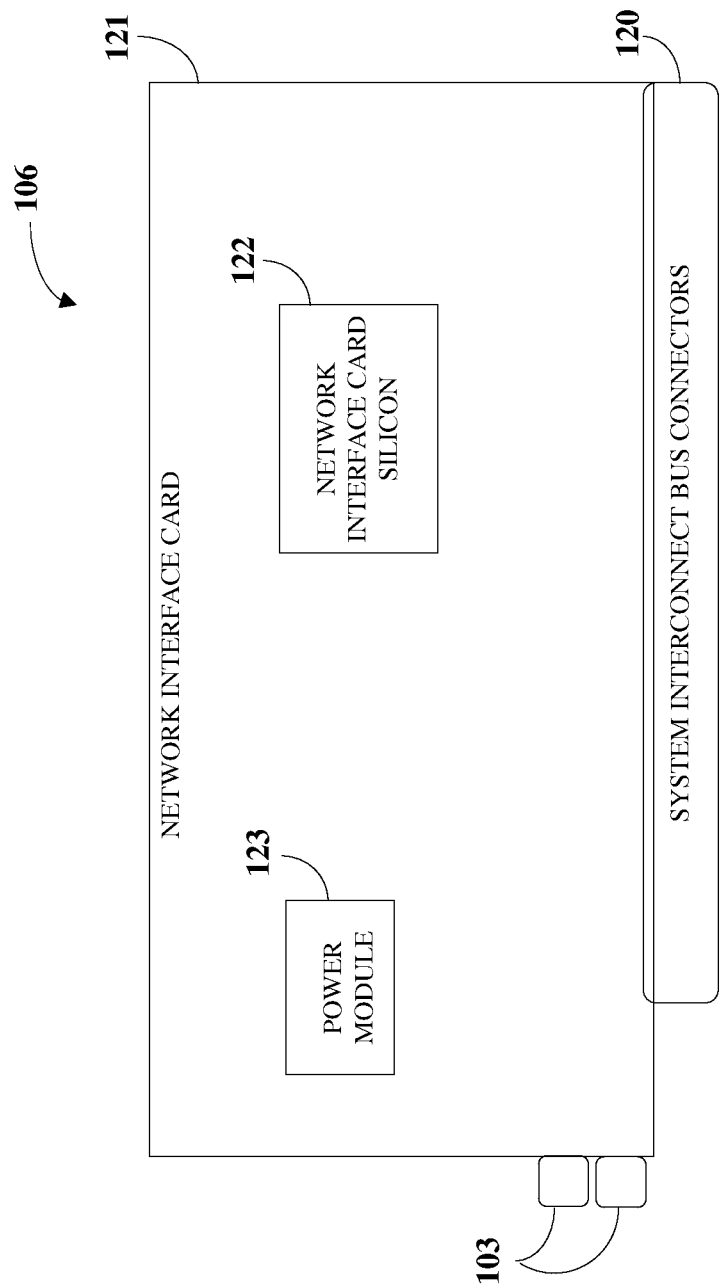
FIG. 8 exemplarily illustrates a top elevation view of an embodiment of the network interface component configured as the network interface card.

FIG. 8 exemplarily illustrates a top elevation view of an embodiment of the network interface component 106 configured as the network interface card 121. In this embodiment, the network interface component 106 is a network interface card 121 free of a system on chip (SoC) and enables the unified converged network, storage and compute system (UCNSCS) 100 exemplarily illustrated in FIG. 7, to connect to a network. FIG. 8 exemplarily illustrates components of the network interface card 121. The network interface card 121 comprises system interconnect bus connectors 120, a network interface card silicon 122, a power module 123, and two network ports 103 as exemplarily illustrated in FIG. 8. The network interface card 121 is operably connected to the system board 104 exemplarily illustrated in FIG. 7, via the system interconnect bus connectors 120. The system interconnect bus connectors 120 are, for example, peripheral component interconnect express (PCIe) connectors such as PCIe version 2.x/3.x/4.x connectors. The PCIe connectors of the network interface card 121 are connected to the PCIe slots (not shown) of the system board 104. The network interface card silicon 122, in communication with the network module 109 of the unified converged network, storage and compute application (UCNSCA) 107 or 112 exemplarily illustrated in FIGS. 3-4, facilitates data flow through the network ports 103. The network interface card silicon 122 is configured to be controlled directly by the UCNSCS 100 and to configure the UCNSCS 100 to connect to a network of UCNSCSs and other storage devices of other UCNSCSs connected over the network. The network interface card silicon 122 used in the network interface card 121 is manufactured, for example, by Intel Corporation, Marvell Technology Group Limited, Realtek Semiconductor Corp., etc. As the network interface card 121 is free of the SoC, the application software that is needed to manage a physical hardware component such as the network interface card silicon 122, runs on the main CPU 117 of the system board 104 exemplarily illustrated in FIG. 7.

The power module 123 supplies power from an external power source (not shown) to the network interface card 121. The network ports 103 of the network interface card 121 are configured to be connected to a network. The network ports 103 are, for example, quad small form-factor pluggable (QSFP+) ports. In an embodiment, the network ports 103 of the network interface card 121 can be configured, for example, as Ethernet ports or fibre channel over Ethernet ports. The network ports 103 are configured to allow the unified converged network, storage and compute system (UCNSCS) 100 to operate, for example, as a fibre channel over an Ethernet switch, an Ethernet switch and/or an Ethernet router, or any combination thereof. In an embodiment, the network interface card 121 provides network connectivity to the UCNSCS 100 at a speed of, for example, about 40 Gigabits per second (Gbps). The network interface card 121 does not facilitate a direct connection of the UCNSCS 100 to storage devices 102 exemplarily illustrated in FIG. 2A. However, the network interface card 121 allows the UCNSCS 100 to connect to the storage devices of sibling UCNSCSs that are connected together in a computer cluster, for example, over an Ethernet network.

Figure 9A:
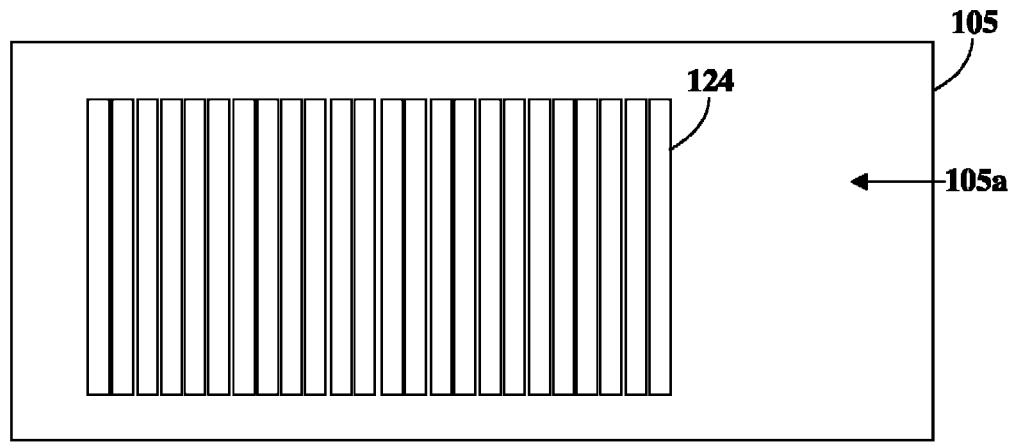
FIG. 9A exemplarily illustrates a front section of a storage interface component of the unified converged network, storage and compute system.
Figure 9B:
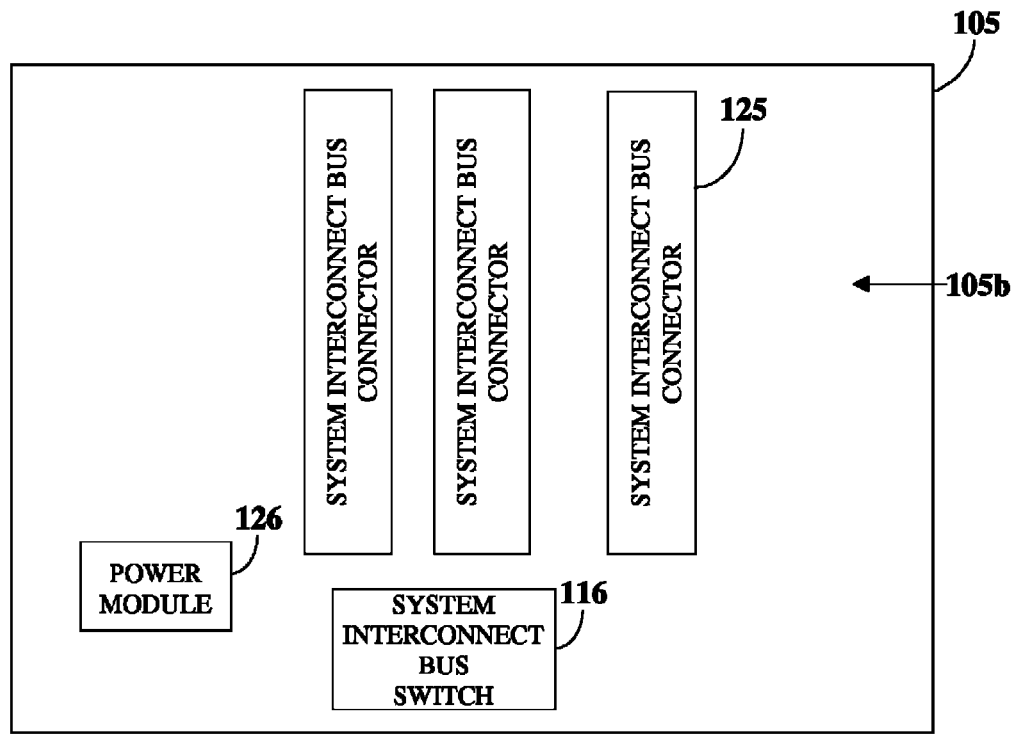
FIG. 9B exemplarily illustrates a rear section of the storage interface component of the unified converged network, storage and compute system.

FIGS. 9A-9B exemplarily illustrate the storage interface component 105 of the unified converged network, storage and compute system (UCNSCS) 100 exemplarily illustrated in FIG. 5 and FIG. 7. The storage interface component 105 is configured, for example, within a two rack unit chassis 201 of the UCNSCS 100 exemplarily illustrated in FIGS. 2A-2B. FIG. 9A exemplarily illustrates a front section 105a of the storage interface component 105 of the UCNSCS 100. The storage interface component 105 comprises disk interface connectors 124. The disk interface connectors 124 are configured, for example, on the front section 105a of the storage interface component 105 as exemplarily illustrated in FIG. 9A, to connect to the array of storage devices 102 as exemplarily illustrated in FIG. 2A. The disk interface connectors 124 are, for example, serial advanced technology attachment express (SATAe) disk drive connectors mounted on a printed circuit board (PCB) of the storage interface component 105. In an embodiment, the disk interface connectors 124 are peripheral component interconnect express (PCIe) 3.x/4.x connectors.

FIG. 9B exemplarily illustrates a rear section 105b of the storage interface component 105 of the unified converged network, storage and compute system (UCNSCS) 100 exemplarily illustrated in FIG. 5 and FIG. 7. The storage interface component 105 further comprises a system interconnect bus switch 116 and system interconnect bus connectors 125 as exemplarily illustrated in FIG. 9B. As used herein, "system interconnect bus switch" refers to a switch that enables connections to multiple devices from one end point. The system interconnect bus switch 116 is configured, for example, on the rear section 105b of the storage interface component 105 to connect the array of storage devices 102 exemplarily illustrated in FIG. 2A, to the system board 104 exemplarily illustrated in FIGS. 3-4, FIG. 5, and FIG. 7. The system interconnect bus switch 116 is, for example, a peripheral component interconnect express (PCIe) switch.

The system interconnect bus connectors 125 are configured, for example, on the rear section 105b of the storage interface component 105 as exemplarily illustrated in FIG. 9B, to connect to the system board 104. The system interconnect bus connectors 125 are, for example, peripheral component interconnect express (PCIe) connectors such as PCIe version 3.x/4.x slots positioned on the rear section 105b of the storage interface component 105. The PCIe connectors of the storage interface component 105 are connected to the PCIe slots (not shown) of the system board 104. In an embodiment, the rear section 105b of the storage interface component 105 is compliant with PCIe version 3.x/4.x of the system board 104. The storage interface component 105 further comprises, for example, one or more power supply connectors (not shown) and one or more power modules 126 mounted on the rear section 105b of the storage interface component 105. The power modules 126 supply and regulate power to the storage interface component 105 and the storage devices 102 exemplarily illustrated in FIG. 2A.

Figure 10:
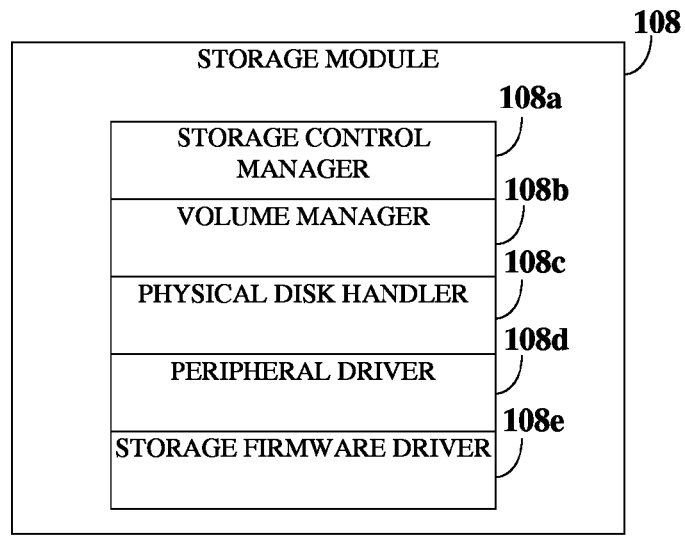
FIG. 10 exemplarily illustrates internal components of a storage module of the unified converged network, storage and compute application.

FIG. 10 exemplarily illustrates internal components of the storage module 108 of the unified converged network, storage and compute application (UCNSCA) 107 or 112 exemplarily illustrated in FIGS. 3-4. In an embodiment as exemplarily illustrated in FIG. 10, the storage module 108 comprises a storage firmware driver 108e, a peripheral driver 108d, a physical disk handler 108c, a volume manager 108b, and a storage control manager 108a. The storage firmware driver 108e identifies and configures the storage interface component 105 exemplarily illustrated in FIGS. 3-4, FIG. 5, and FIG. 7. The storage firmware driver 108e then registers the storage interface component 105 with the system interconnect bus 111 exemplarily illustrated in FIGS. 3-4, FIG. 5, and FIG. 7. The storage firmware driver 108e configures the storage interface component 105 and monitors data flow between the storage interface component 105, the system board 104, and the storage devices 102 exemplarily illustrated in FIGS. 3-4. The storage firmware driver 108e recognises and passes the attached storage devices 102 to the peripheral driver 108d. The peripheral driver 108d recognises the storage devices 102 by their protocol and maintains the storage devices 102 in an enumerated list. The peripheral driver 108d communicates with each storage device 102 by a respective protocol, for example, a small computer system interface protocol, an advanced technology attachment protocol, etc., of each storage device 102.

The physical disk handler 108c performs physical disk abstraction and keeps track of storage devices 102 such as physical disks that are either directly attached or attached over a network to the unified converged network, storage and compute system (UCNSCS) 100a exemplarily illustrated in FIG. 3, or 100b exemplarily illustrated in FIG. 4. The physical disk handler 108c also abstracts interactions between the attached physical disks by acting as an advanced technology attachment (ATA), a small computer system interface (SCSI), and an Ethernet protocol agnostic layer. The volume manager 108b accumulates the physical disks tracked by the physical disk handler 108c to form a logical disk. As used herein, "logical disk" refers to a virtual device that provides an area of usable storage capacity on one or more storage devices 102 in the UCNSCS 100a or 100b. The logical disk is also referred to as a logical volume or a virtual disk. The storage control manager 108a presents the logical disk as a physical storage device 102 to a consumer. In the implementation of the unified converged network, storage and compute application (UCNSCA) 107 as a hypervisor exemplarily illustrated in FIG. 3, logical disks are provisioned to the UCNSCA 107 as a local disk. In the implementation of the unified converged network, storage and compute application (UCNSCA) 112 as a virtual machine exemplarily illustrated in FIG. 4, the logical disks are provisioned over the network using an Ethernet technology.

Figure 11:
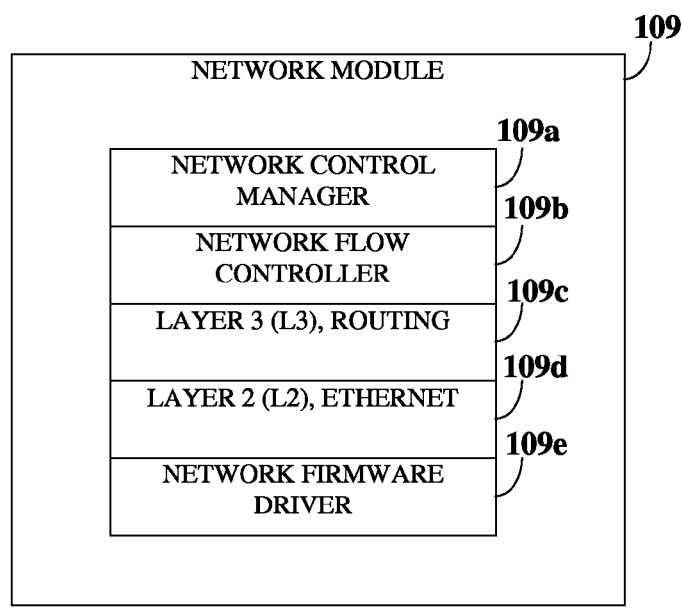
FIG. 11 exemplarily illustrates internal components of a network module of the unified converged network, storage and compute application.

FIG. 11 exemplarily illustrates internal components of the network module 109 of the unified converged network, storage and compute application (UCNSCA) 107 or 112 exemplarily illustrated in FIGS. 3-4. In an embodiment as exemplarily illustrated in FIG. 11, the network module 109 comprises a network firmware driver 109e, a layer 2 (L2), Ethernet 109d, a layer 3 (L3) for routing 109c, a network flow controller 109b, and a network control manager 109a. The network firmware driver 109e identifies and configures the network interface component 106, that is, the converged network switch and router adapter (CNSRA) 114 exemplarily illustrated in FIG. 6, or the network interface card 121 exemplarily illustrated in FIG. 8. The network firmware driver 109e then registers the network interface component 106 with the system interconnect bus 111 exemplarily illustrated in FIGS. 3-4, FIG. 5, and FIG. 7. The network firmware driver 109e configures the network interface component 106 and monitors data flow between the system board 104, the network interface component 106, and the network ports 103 exemplarily illustrated in FIG. 5 and FIG. 7. The layer 2 109d configures and maintains a flow table for a flow of network packets. Based on a destination address of a received network packet, the layer 2 109d redirects the flow of network packets to respective network interfaces as set in the flow table. The layer 3 109c configures and maintains a routing table for the flow of network packets. The layer 3 109c also maintains a virtual extensible local area network (VXLAN) domain. The network flow controller 109b recognises flow instructions from the network control manager 109a, for example, based on the Open-Flow™ protocol versions 1.0, 1.1, and 1.2 of the Open Networking Foundation. The network flow controller 109b is an interpreter of Openflow™ based commands to the native flow instructions. The network control manager 109a configures the network flow controller 109b to setup the flow table for the layer 2 109d and the layer 3 109c. The network control manager 109a provides an interface for interacting with the network firmware driver 109e to configure the network interface component 106.

Figure 12:
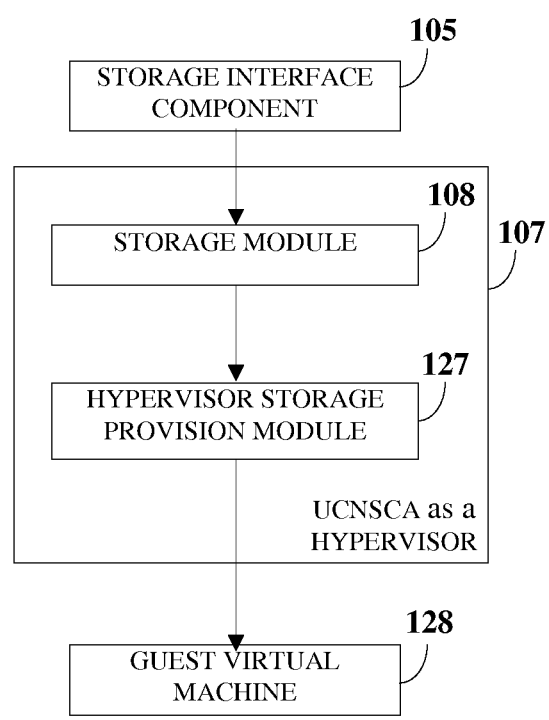
FIG. 12 exemplarily illustrates an implementation of the unified converged network, storage and compute application as a hypervisor.

FIG. 12 exemplarily illustrates an implementation of the unified converged network, storage and compute application (UCNSCA) 107 as a hypervisor. The UCNSCA 107 as a hypervisor comprises the storage module 108 and a hypervisor storage provision module 127. An array of storage devices 102 are connected to the storage interface component 105 exemplarily illustrated in FIG. 3. Data read from the storage devices 102 is passed to the storage module 108 via the storage interface component 105. The storage module 108 virtualizes the storage devices 102 that are connected through the storage interface component 105. The storage module 108 pools the storage devices 102 that are local to a server appliance and also pools the storage devices that are connected over a network and creates a logical disk. The storage module 108 exposes the logical disk to the hypervisor storage provision module 127. The hypervisor storage provision module 127 provisions the logical disk to a guest virtual machine 128.

Figure 13:
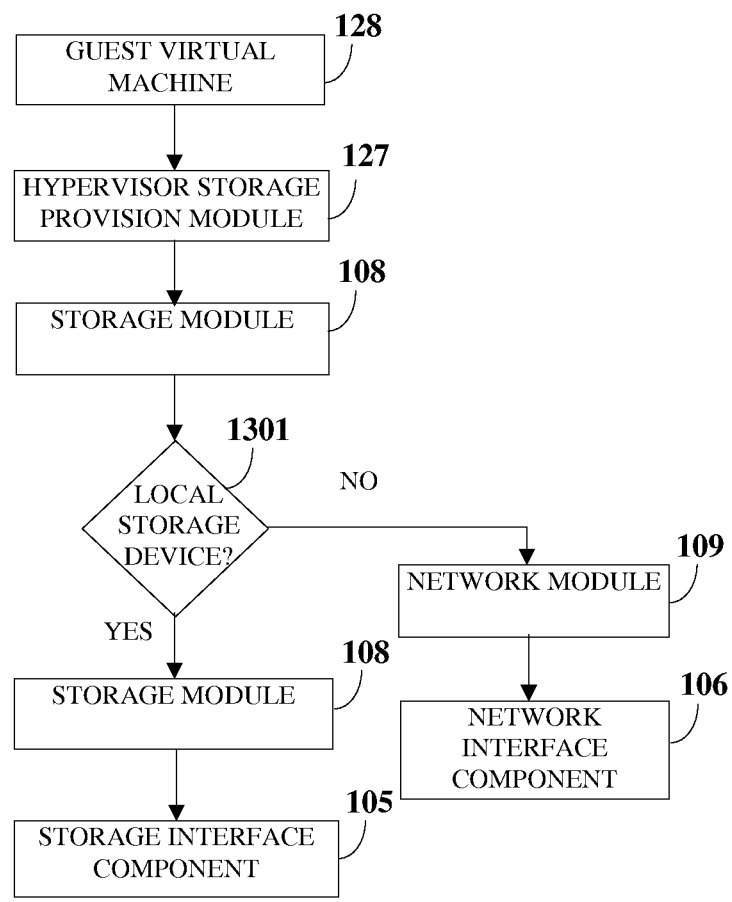
FIG. 13 exemplarily illustrates a flowchart showing operation of the unified converged network, storage and compute application as a hypervisor.

FIG. 13 exemplarily illustrates a flowchart showing operation of the unified converged network, storage and compute application (UCNSCA) 107 as a hypervisor exemplarily illustrated in FIG. 3 and FIG. 12. A guest virtual machine 128 that has a logical disk provisioned by the hypervisor storage provision module 127 of the UCNSCA 107 writes or reads data from a storage device connected to the unified converged network, storage and compute system (UCNSCS) 100a exemplarily illustrated in FIG. 3. The hypervisor storage provision module 127 receives an input/output (I/O) request from the guest virtual machine 128 and forwards the I/O request to the storage module 108. The storage module 108 checks 1301 whether the I/O request is for a local storage device 102 or a network storage device, that is, a storage device connected to the UCNSCS 100a over a network. If the I/O request is for a local storage device 102, the storage module 108 retains and handles the I/O request, in communication with the storage interface component 105. If the I/O request is for a network storage device, the storage module 108 forwards the I/O request to the network module 109. The network module 109 forwards the I/O request, via the network interface component 106, to a UCNSCA of another UCNSCS in the network, which is connected to the network storage device directly.

Figure 14:
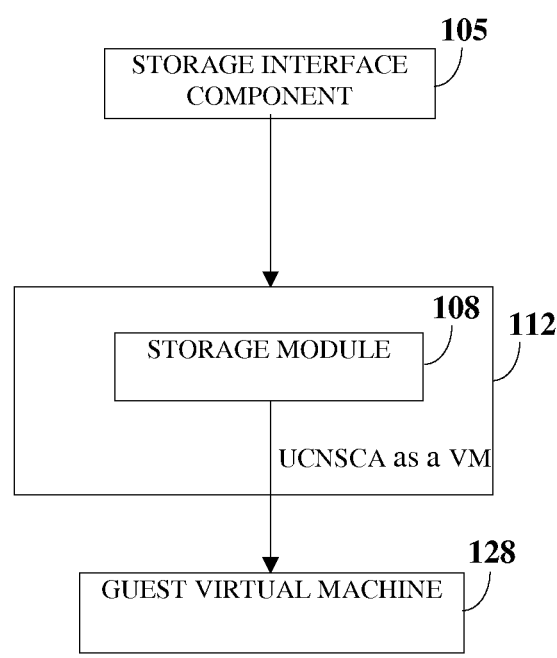
FIG. 14 exemplarily illustrates an implementation of the unified converged network, storage and compute application as a virtual machine.

FIG. 14 exemplarily illustrates an implementation of the unified converged network, storage and compute application (UCNSCA) 112 as a virtual machine. The array of storage devices 102 are connected to the storage interface component 105 exemplarily illustrated in FIG. 4. The storage interface component 105 passes the data read from the storage devices 102 to the storage module 108. The storage module 108 virtualizes the storage devices 102 that are connected through the storage interface component 105. The storage module 108 pools the storage devices 102 that are local to the server appliance and also the storage devices that are connected over a network and creates a logical disk. The storage module 108 exposes the logical disk to a guest virtual machine 128 either on the same server appliance or another server appliance in the network. The storage module 108 provisions the logical disk as a network drive to the guest virtual machine 128.

Figure 15:
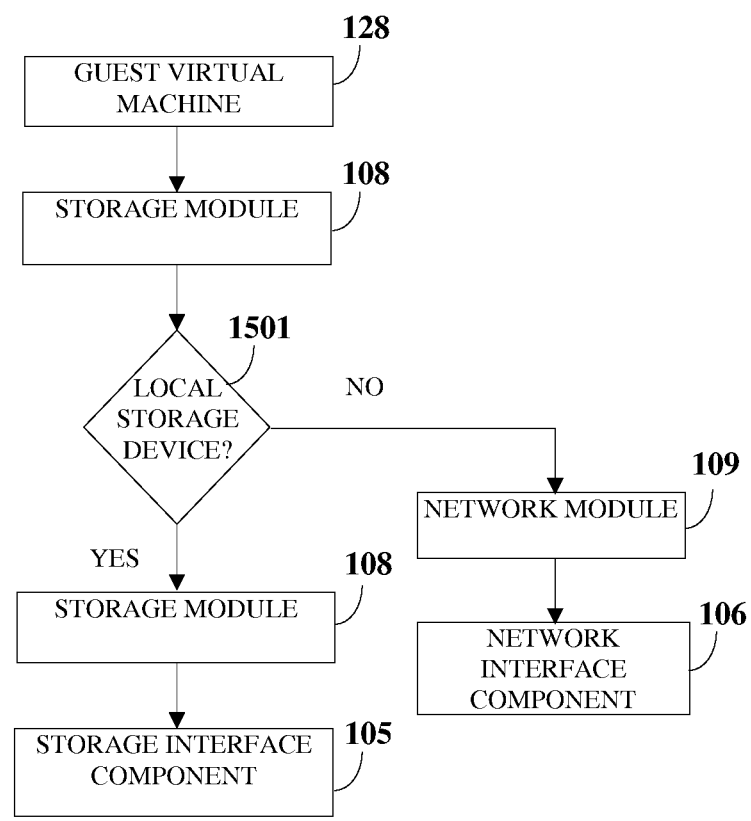
FIG. 15 exemplarily illustrates a flowchart showing operation of the unified converged network, storage and compute application as a virtual machine.

FIG. 15 exemplarily illustrates a flowchart showing operation of the unified converged network, storage and compute application (UCNSCA) 112 as a virtual machine exemplarily illustrated in FIG. 4 and FIG. 14. A guest virtual machine 128 that has a logical disk provisioned by the UCNSCA 112 writes or reads data from a storage device connected to the unified converged network, storage and compute system (UCNSCS) 100b exemplarily illustrated in FIG. 4. The storage module 108 of the UCNSCA 112 receives an input/output (I/O) request from the guest virtual machine 128 and checks 1501 whether the I/O request is for a local storage device 102 or a network storage device. If the I/O request is for a local storage device 102, the storage module 108 retains and handles the I/O request, in communication with the storage interface component 105. If the I/O request is for a network storage device, the storage module 108 forwards the I/O request to the network module 109. The network module 109 forwards the I/O request, via the network interface component 106, to a UCNSCA of another UCNSCS in the network, which is connected to the network storage device directly.

Figure 16:
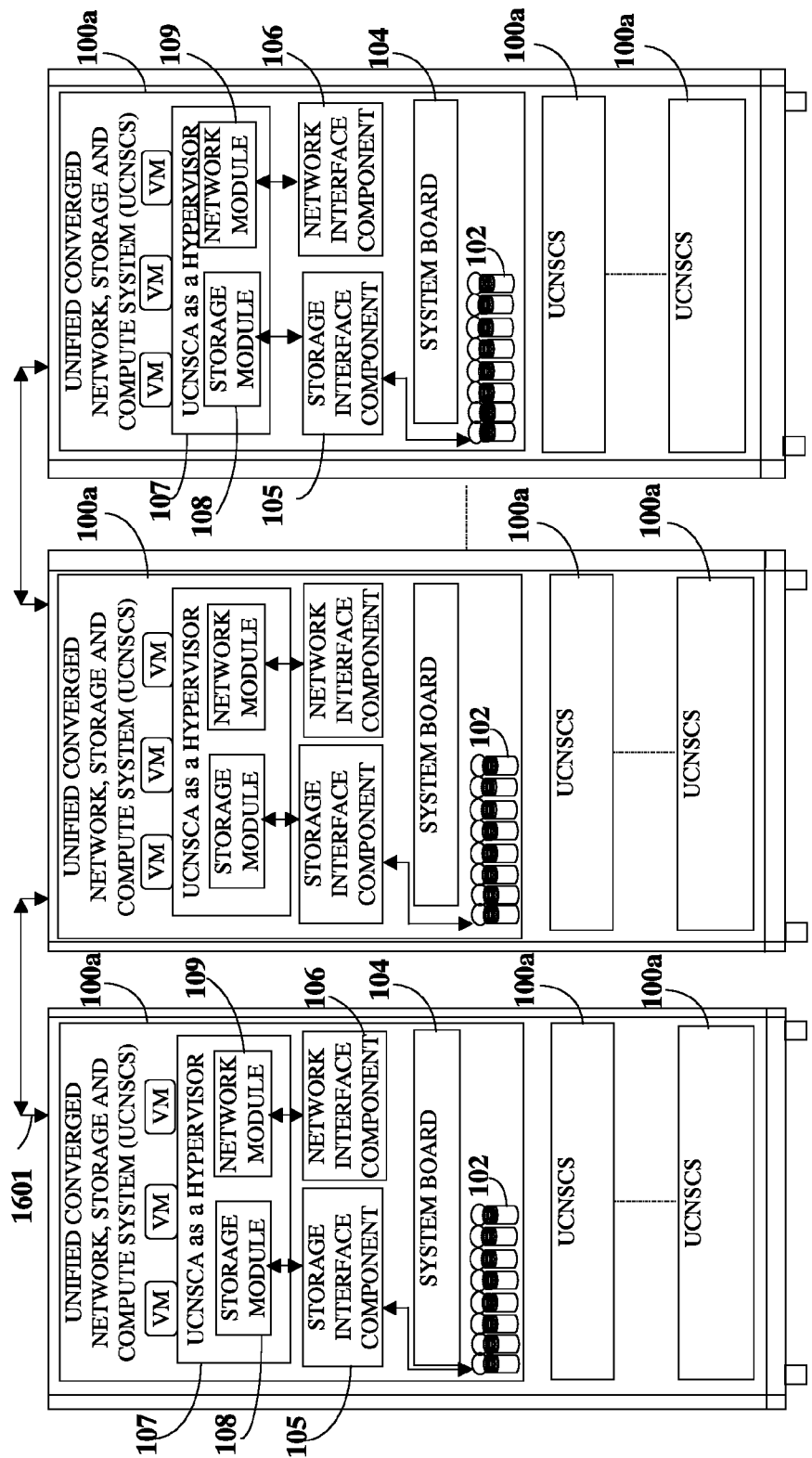
FIG. 16 exemplarily illustrates an implementation of multiple unified converged network, storage and compute systems in operative communication with each other for networking, storage virtualization, computing, and data processing in a data center, where the unified converged network, storage and compute application in each of the unified converged network, storage and compute systems functions as a hypervisor.

FIG. 16 exemplarily illustrates an implementation of multiple unified converged network, storage and compute systems (UCNSCSs) 100a in operative communication with each other for networking, storage virtualization, computing, and data processing in a data center, where the unified converged network, storage and compute application (UCNSCA) 107 in each of the UCNSCSs 100a functions as a hypervisor. FIG. 16 exemplarily illustrates a cluster of UCNSCSs 100a with the UCNSCA 107 as a hypervisor comprising the storage module 108 and the network module 109. In this embodiment, the network module 109 in the top of the rack UCNSCS 100a with the network interface component 106, for example, the converged network switch and router adapter (CNSRA) 114 exemplarily illustrated in FIGS. 5-6, enables other UCNSCSs 100a with the network interface component 106, for example, the network interface card 121 exemplarily illustrated in FIGS. 7-8, below the top of the rack UCNSCS 100a to be connected to the top of the rack UCNSCS 100a through the network ports 103 exemplarily illustrated in FIG. 2B and FIGS. 5-8. The UCNSCA 107 enables the storage devices 102 of the UCNSCSs 100a connected in a computer cluster, for example, through an Ethernet network to provide logical volumes to other UCNSCSs 100a for implementing storage virtualization in a data center. A logical volume is an allocation of storage that is less than or more than one physical drive. The UCNSCSs 100a are connected to each other in the computer cluster, for example, using an Ethernet cable 1601 connected to their respective network ports 103 exemplarily illustrated in FIG. 2B. The UCNSCA 107 allows collaboration of storage capacity of the storage devices 102 of each UCNSCS 100a in the computer cluster into a single logical disk to provide logical volumes to each UCNSCS 100a in the computer cluster.

Figure 17:
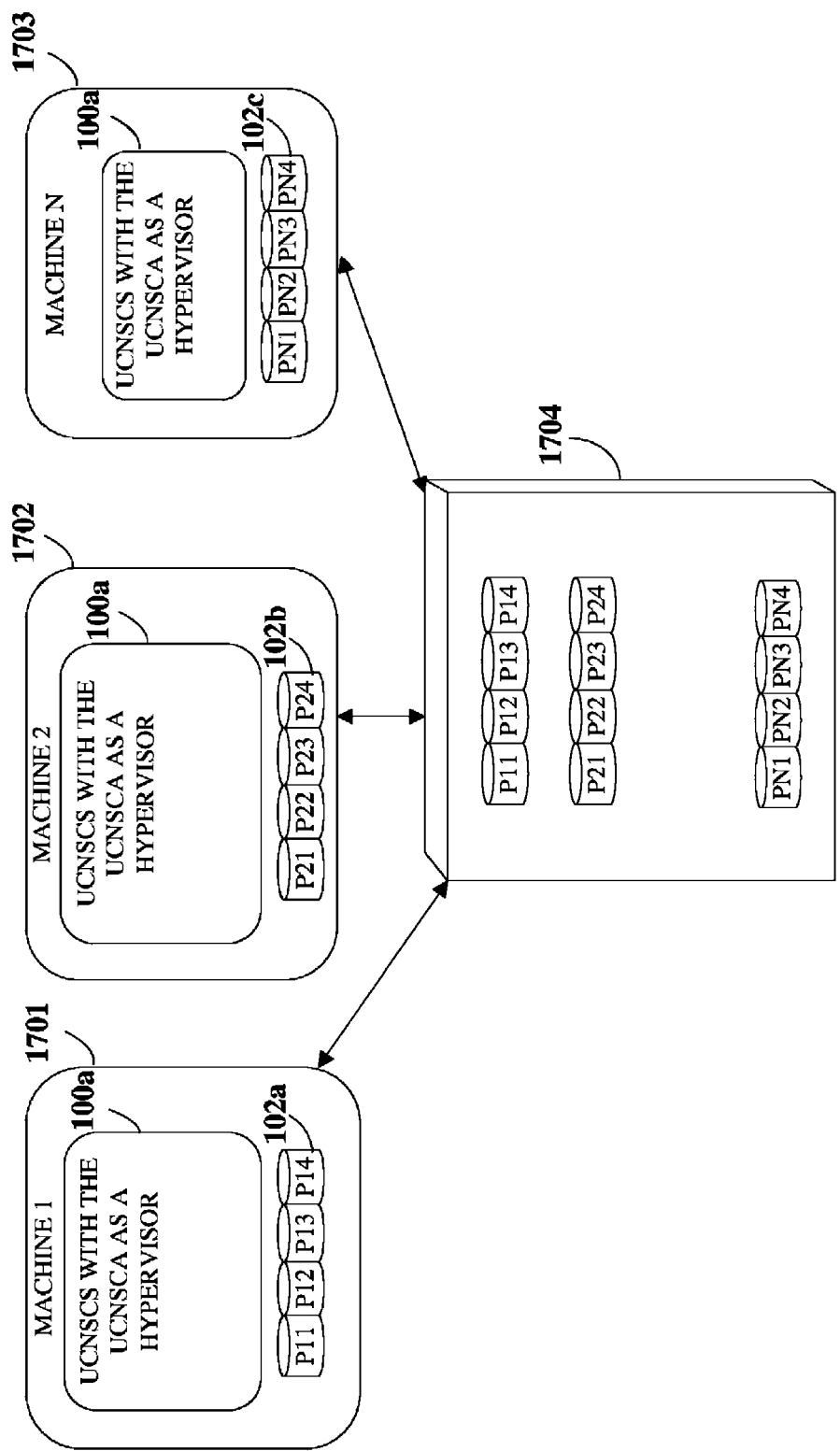
FIG. 17 exemplarily illustrates creation of a logical disk by the unified converged network, storage and compute application configured as a hypervisor.

FIG. 17 exemplarily illustrates creation of a logical disk 1704 by the unified converged network, storage and compute application (UCNSCA) 107 configured as a hypervisor exemplarily illustrated in FIG. 3. The UCNSCA 107 as a hypervisor comprises the storage module 108 and the network module 109 exemplarily illustrated in FIG. 3, therewithin. In an embodiment, the UCNSCA 107 implements an array of storage devices 102a, 102b, and 102c by accumulating the storage devices 102a, 102b, and 102c from other UCNSCSs 100a over an Ethernet network using the storage module 108 and the network module 109. Consider an example where there are N machines, namely, machine 1 1701, machine 2 1702, . . . , and machine N 1703. Each of the machines has four storage devices, for example, P11, P12, P13, and P14 102a, P21, P22, P23, and P24 102b, and PN1, PN2, PN3, and PN4 102c connected locally. The storage module 108 and the network module 109 running in the UCNSCA 107 functioning as a hypervisor pools the four storage devices 102a, 102b, and 102c via a network and creates a logical disk 1704. The UCNSCA 107 as a hypervisor that hosts the storage module 108 and the network module 109 therewithin thereby facilitates creation, configuration, and management of a data center infrastructure.

Figure 18:
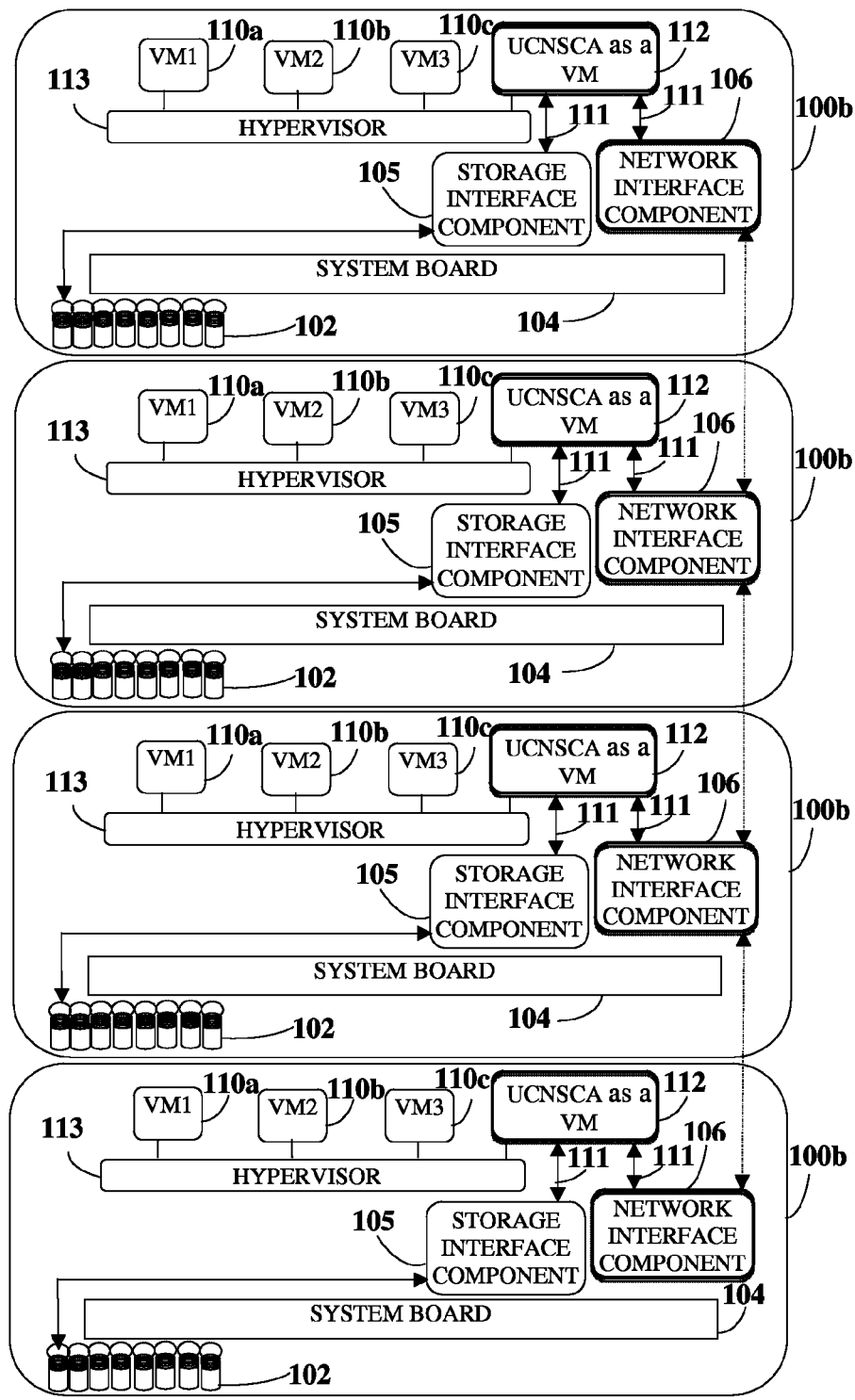
FIG. 18 exemplarily illustrates an implementation of multiple unified converged network, storage and compute systems in operative communication with each other for networking, storage virtualization, computing, and data processing in a data center, where the unified converged network, storage and compute application in each of the unified converged network, storage and compute systems functions as a virtual machine.

FIG. 18 exemplarily illustrates an implementation of multiple unified converged network, storage and compute systems (UCNSCSs) 100b in operative communication with each other for networking, storage virtualization, computing, and data processing in a data center, where the unified converged network, storage and compute application (UCNSCA) 112 in each of the UCNSCSs 100b functions as a virtual machine. FIG. 18 exemplarily illustrates the cluster of UCNSCSs 100b, each with the UCNSCA 112 as a virtual machine running on a hypervisor 113, comprising the storage module 108 and the network module 109 exemplarily illustrated in FIG. 4. In this embodiment, the network module 109 in the top of the rack UCNSCS 100b with the network interface component 106, for example, the converged network switch and router adapter (CNSRA) 114 exemplarily illustrated in FIGS. 5-6, enables other UCNSCSs 100b with the network interface component 106, for example, the network interface card 121 exemplarily illustrated in FIGS. 7-8, to be connected to the top of the rack UCNSCS 100b through the network ports 103 exemplarily illustrated in FIG. 2B and FIGS. 5-8. The UCNSCA 112 enables storage devices 102 of the UCNSCSs 100b connected in a computer cluster, for example, through an Ethernet network to provide logical volumes to other UCNSCSs 100b for implementing storage virtualization in a data center. The UCNSCA 112 allows collaboration of storage capacity of the storage devices 102 of each UCNSCS 100b in the computer cluster into a single logical disk to provide logical volumes to each UCNSCS 100b in the computer cluster. FIG. 16 and FIG. 18 exemplarily illustrate the cluster of UCNSCSs 100a and 100b respectively, irrespective of the UCNSCA 107 or 112 being a hypervisor or a virtual machine exemplarily illustrated in FIG. 3-4.

Figure 19:
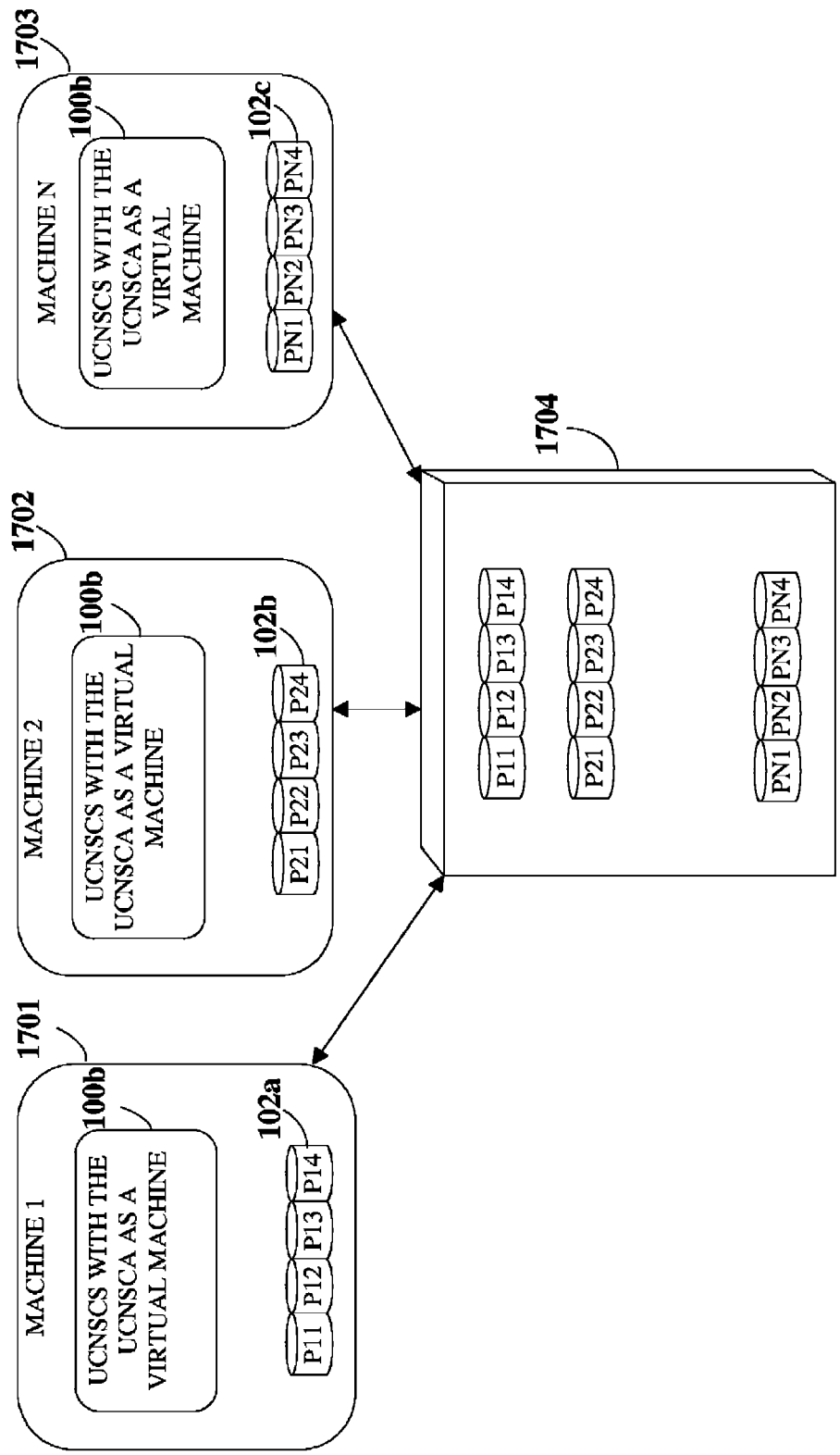
FIG. 19 exemplarily illustrates creation of a logical disk by the unified converged network, storage and compute application configured as a virtual machine.

FIG. 19 exemplarily illustrates creation of a logical disk 1704 by the unified converged network, storage and compute application (UCNSCA) 112 configured as a virtual machine exemplarily illustrated in FIG. 4. The storage module 108 and the network module 109 of the UCNSCA 112 functioning as a virtual machine exemplarily illustrated in FIG. 4, expand the functionality of the unified converged network, storage and compute system (UCNSCS) 100b to operate as a converged network switch and/or a network router 101 and an array of storage devices 102 exemplarily illustrated in FIG. 1. In an embodiment, the UCNSCA 112 implements the array of storage devices 102a, 102b, and 102c by accumulating the storage devices 102a, 102b, and 102c from other UCNSCSs 100b over an Ethernet network using the storage module 108 and the network module 109. Consider an example where there are N machines, namely, machine 1 1701, machine 2 1702, . . . , and machine N 1703. Each of the machines has four storage devices, for example, P11, P12, P13, and P14 102a, P21, P22, P23, and P24 102b, and PN1, PN2, PN3, and PN4 102c connected locally. The storage module 108 and the network module 109 running in the UCNSCA 112 functioning as a virtual machine pools the four storage devices 102a, 102b, and 102c via a network and creates a logical disk 1704. The UCNSCA 112 as a virtual machine that hosts the storage module 108 and the network module 109 therewithin thereby facilitates creation, configuration, and management of a data center infrastructure.

The unified converged network, storage and compute system (UCNSCS) 100, 100a, or 100b exemplarily illustrated in FIGS. 2A-2B and FIGS. 3-4, disclosed herein can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The foregoing examples have been provided merely for the purpose of explanation and are in no way to be construed as limiting of the unified converged network, storage and compute system (UCNSCS) 100, 100a, or 100b exemplarily illustrated in FIGS. 2A-2B and FIGS. 3-4, and the unified converged network, storage and compute application (UCNSCA) 107 or 112 exemplarily illustrated in FIGS. 3-4 disclosed herein. While the UCNSCS 100, 100a, or 100b has been described with reference to various embodiments, it is understood that the words, which have been used herein, are words of description and illustration, rather than words of limitation. Further, although the UCNSCS 100, 100a, or 100b has been described herein with reference to particular means, materials, and embodiments, the UCNSCS 100, 100a, or 100b is not intended to be limited to the particulars disclosed herein; rather, the UCNSCS 100, 100a, or 100b extends to all functionally equivalent structures, methods and uses, such as are within the scope of the appended claims. Those skilled in the art, having the benefit of the teachings of this specification, may effect numerous modifications thereto and changes may be made without departing from the scope and spirit of the UCNSCS 100, 100a, or 100b disclosed herein in its aspects.

We claim:

1. A unified converged network, storage and compute system comprising:
  a system board;
  interface components free of a system on chip and operably connected to said system board, said interface components comprising:
    a storage interface component operably connected to said system board via first system interconnect bus connectors, said storage interface component configured to connect an array of storage devices to said system board; and
    a network interface component operably connected to said system board via second system interconnect bus connectors, wherein said network interface component is a converged network switch and router adapter free of said system on chip, and wherein said network interface component is configured to form a network of said unified converged network, storage and compute systems; and
  a unified converged network, storage and compute application executable by at least one processor configured to control and manage operations of said unified converged network, storage and compute system and expand functionality of said unified converged network, storage and compute system to operate as a converged network switch, network router, and storage array, said unified converged network, storage and compute application further configured as one of a hypervisor and a virtual machine, said unified converged network, storage and compute application comprising:
    a storage module configured to interact with said storage interface component via a first system interconnect bus to configure said storage interface component, wherein said storage module monitors data flow between said storage interface component, said system board, and said array of storage devices, wherein said storage module is further configured to access data stored in said array of storage devices connected to said storage interface component, and wherein said storage module is further configured to access data stored in storage devices of other of said unified converged network, storage and compute systems over said network via said network interface component; and
    a network module configured to interact with said network interface component via a second system interconnect bus to configure said network interface component, monitor data flow through said network interface component, perform connections to a network, perform network switching functions, and perform network router functions.

2. The unified converged network, storage and compute system of claim 1, wherein said converged network switch and router adapter comprises:
  a network fabric silicon configured to be controlled directly by said unified converged network, storage and compute system and to configure said unified converged network, storage and compute system to function as a converged network switch and network router;
  a power module configured to supply power to said converged network switch and router adapter from an external power source; and
  a plurality of network ports configured to be connected to said network.

3. The unified converged network, storage and compute system of claim 1, wherein said storage interface component comprises:
  disk interface connectors configured on a first section of said storage interface component to connect to said array of storage devices;
  a system interconnect bus switch configured on a second section of said storage interface component to connect said array of storage devices to said system board; and
  said first system interconnect bus connectors configured on said second section of said storage interface component to connect to said system board.

4. A unified converged network, storage and compute system comprising:
  a system board;
  interface components free of a system on chip and operably connected to said system board, said interface components comprising:
    a storage interface component operably connected to said system board via first system interconnect bus connectors, said storage interface component configured to connect an array of storage devices to said system board; and
    a network interface component operably connected to said system board via second system interconnect bus connectors, wherein said network interface component is a network interface card free of said system on chip, and wherein said network interface component is configured to connect to a network and form a network-of unified converged network, storage and compute systems; and a unified converged network, storage and compute application executable by at least one processor configured to control and manage operations of said unified converged network, storage and compute system and expand functionality of said unified converged network, storage and compute system, said unified converged network, storage and compute application further configured as one of a hypervisor and a virtual machine, said unified converged network, storage and compute application comprising:

- a storage module configured to interact with said storage interface component via a first system interconnect bus to configure said storage interface component, wherein said storage module monitors data flow between said storage interface component, said system board, and said array of storage devices, wherein said storage module is further configured to access data stored in said array of storage devices connected to said storage interface component, and wherein said storage module is further configured to access data stored in storage devices of other of said unified converged network, storage and compute systems over said network via said network interface component;
- a network module configured to interact with said network interface component via a second system interconnect bus to configure said network interface component, monitor data flow through said network interface component, and perform connections to said network.

5. The unified converged network, storage and compute system of claim 4, wherein said storage interface component comprises:

- disk interface connectors configured on a first section of said storage interface component to connect to said array of storage devices;
- a system interconnect bus switch configured on a second section of said storage interface component to connect said array of storage devices to said system board; and
- said first system interconnect bus connectors configured on said second section of said storage interface component to connect to said system board.

6. The unified converged network, storage and compute system of claim 4, wherein said network interface card further comprises:

- a network interface card silicon configured to be controlled directly by said unified converged network, storage and compute system and to configure said unified converged network, storage and compute system to connect to a network of unified converged network, storage and compute systems and other storage devices of other unified converged network, storage and compute systems connected over said network;
- a power module configured to supply power to said network interface card from an external power source; and network ports configured to be connected to said network.

* * * * *